US009235393B2

(12) United States Patent
Moritz

(10) Patent No.: US 9,235,393 B2
(45) Date of Patent: Jan. 12, 2016

(54) STATICALLY SPECULATIVE COMPILATION AND EXECUTION

(71) Applicant: III Holdings 2, LLC, Wilmington, DE (US)

(72) Inventor: Csaba Andras Moritz, Amherst, MA (US)

(73) Assignee: III HOLDINGS 2, LLC, Wilmington, DE (US)

( * ) Notice: Subject to any disclaimer, the term of this patent is extended or adjusted under 35 U.S.C. 154(b) by 0 days.

(21) Appl. No.: 14/192,438

(22) Filed: Feb. 27, 2014

(65) Prior Publication Data

US 2014/0331030 A1 Nov. 6, 2014

Related U.S. Application Data

(63) Continuation of application No. 13/669,687, filed on Nov. 6, 2012, now abandoned, which is a continuation of application No. 13/033,159, filed on Feb. 23, 2011, now abandoned, which is a continuation of application No. 12/347,252, filed on Dec. 31, 2008, now abandoned, which is a continuation of application No. 10/191,646, filed on Jul. 9, 2002, now Pat. No. 7,493,607.

(51) Int. Cl.
*G06F 9/45* (2006.01)
*G06F 1/32* (2006.01)

(52) U.S. Cl.
CPC ............... *G06F 8/4432* (2013.01); *G06F 1/32* (2013.01); *Y02B 60/181* (2013.01)

(58) Field of Classification Search
None
See application file for complete search history.

(56) References Cited

U.S. PATENT DOCUMENTS

| 3,603,934 A | 9/1971 | Heath, Jr. |
| 4,003,033 A | 1/1977 | O'Keefe |
| 4,037,090 A | 7/1977 | Raymond, Jr. |
| 4,042,972 A | 8/1977 | Gruner |
| 4,050,058 A | 9/1977 | Garlic |
| 4,067,059 A | 1/1978 | Derchak |
| 4,079,455 A | 3/1978 | Ozga |
| 4,101,960 A | 7/1978 | Stokes |
| 4,110,822 A | 8/1978 | Porter |

(Continued)

FOREIGN PATENT DOCUMENTS

| EP | 0314277 A2 | 5/1989 |
| EP | 0552816 A2 | 7/1993 |

(Continued)

OTHER PUBLICATIONS

Abraham et al., "Automatic and Efficient Evaluation of Memory Hierarchies for Embedded Systems"; 32nd Annual IEEE/ACM International Symposium on Microarchitecture (MICRO'99); p. 114; 1999.

(Continued)

*Primary Examiner* — Qamrun Nahar
(74) *Attorney, Agent, or Firm* — Schwabe, Williamson & Wyatt

(57) ABSTRACT

A system, for use with a compiler architecture framework, includes performing a statically speculative compilation process to extract and use speculative static information, encoding the speculative static information in an instruction set architecture of a processor, and executing a compiled computer program using the speculative static information, wherein executing supports static speculation driven mechanisms and controls.

22 Claims, 11 Drawing Sheets

(56) References Cited

U.S. PATENT DOCUMENTS

| | | |
|---|---|---|
| 4,125,871 A | 11/1978 | Martin |
| 4,128,873 A | 12/1978 | Lamiaux |
| 4,138,720 A | 2/1979 | Chu |
| 4,181,942 A | 1/1980 | Forster |
| 4,255,785 A | 3/1981 | Chamberlin |
| 4,354,228 A | 10/1982 | Moore |
| 4,376,977 A | 3/1983 | Bruinshorst |
| 4,382,279 A | 5/1983 | Ugon |
| 4,403,303 A | 9/1983 | Howes |
| 4,410,939 A | 10/1983 | Kawakami |
| 4,434,461 A | 2/1984 | Puhl |
| 4,435,758 A | 3/1984 | Lorie |
| 4,450,519 A | 5/1984 | Guttag |
| 4,463,421 A | 7/1984 | Laws |
| 4,538,239 A | 8/1985 | Magar |
| 4,541,045 A | 9/1985 | Kromer, III |
| 4,562,537 A | 12/1985 | Barnett |
| 4,577,282 A | 3/1986 | Caudel |
| 4,592,013 A | 5/1986 | Prame |
| 4,604,695 A | 8/1986 | Widen |
| 4,607,332 A | 8/1986 | Goldberg |
| 4,626,988 A | 12/1986 | George |
| 4,649,471 A | 3/1987 | Briggs |
| 4,665,495 A | 5/1987 | Thaden |
| 4,679,140 A | 7/1987 | Gotou |
| 4,709,329 A | 11/1987 | Hecker |
| 4,713,749 A | 12/1987 | Magar |
| 4,714,994 A | 12/1987 | Oklobdzija |
| 4,720,812 A | 1/1988 | Kao |
| 4,772,888 A | 9/1988 | Kimura |
| 4,773,038 A | 9/1988 | Hillis |
| 4,777,591 A | 10/1988 | Chang |
| 4,787,032 A | 11/1988 | Culley |
| 4,803,621 A | 2/1989 | Kelly |
| 4,860,198 A | 8/1989 | Takenaka |
| 4,870,562 A | 9/1989 | Kimoto |
| 4,873,626 A | 10/1989 | Gifford |
| 4,931,986 A | 6/1990 | Daniel |
| 4,992,933 A | 2/1991 | Taylor |
| 5,021,993 A | 6/1991 | Matoba |
| 5,036,460 A | 7/1991 | Takahira |
| 5,038,282 A | 8/1991 | Gilbert |
| 5,045,995 A | 9/1991 | Levinthal |
| 5,070,451 A | 12/1991 | Moore |
| 5,111,389 A | 5/1992 | McAuliffe |
| 5,121,498 A | 6/1992 | Gilbert |
| 5,127,091 A | 6/1992 | Boufarah |
| 5,136,697 A | 8/1992 | Johnson |
| 5,193,202 A | 3/1993 | Jackson |
| 5,224,214 A | 6/1993 | Rosich |
| 5,230,079 A | 7/1993 | Grondalski |
| 5,276,895 A | 1/1994 | Grondalski |
| 5,361,367 A | 11/1994 | Fijany |
| 5,410,669 A | 4/1995 | Biggs |
| 5,430,854 A | 7/1995 | Sprague |
| 5,440,749 A | 8/1995 | Moore |
| 5,479,624 A | 12/1995 | Lee |
| 5,481,684 A | 1/1996 | Richter |
| 5,481,693 A | 1/1996 | Blomgren |
| 5,497,478 A | 3/1996 | Murata |
| 5,524,223 A | 6/1996 | Lazaravich |
| 5,542,059 A | 7/1996 | Blomgren |
| 5,542,074 A | 7/1996 | Kim |
| 5,551,039 A | 8/1996 | Weinberg |
| 5,555,386 A | 9/1996 | Nomura |
| 5,555,428 A | 9/1996 | Radigan |
| 5,560,028 A | 9/1996 | Sachs |
| 5,579,520 A | 11/1996 | Bennett |
| 5,590,283 A | 12/1996 | Hillis |
| 5,590,356 A | 12/1996 | Gilbert |
| 5,598,546 A | 1/1997 | Blomgren |
| 5,604,913 A | 2/1997 | Koyanagi |
| 5,608,886 A | 3/1997 | Blomgren |
| 5,630,143 A | 5/1997 | Maher |
| 5,637,932 A | 6/1997 | Koreeda |
| 5,638,525 A | 6/1997 | Hammond |
| 5,638,533 A | 6/1997 | Law |
| 5,652,894 A | 7/1997 | Hu |
| 5,655,122 A | 8/1997 | Wu |
| 5,655,124 A | 8/1997 | Lin |
| 5,659,722 A | 8/1997 | Blaner |
| 5,659,778 A | 8/1997 | Gingold |
| 5,664,950 A | 9/1997 | Lawrence |
| 5,666,519 A | 9/1997 | Hayden |
| 5,684,973 A | 11/1997 | Sullivan |
| 5,696,958 A | 12/1997 | Mowry |
| 5,704,053 A | 12/1997 | Santhanam |
| 5,721,893 A | 2/1998 | Holler |
| 5,727,229 A | 3/1998 | Kan |
| 5,737,572 A | 4/1998 | Nunziata |
| 5,737,749 A | 4/1998 | Patel |
| 5,742,804 A | 4/1998 | Yeh |
| 5,752,068 A | 5/1998 | Gilbert |
| 5,758,112 A | 5/1998 | Yeager |
| 5,758,176 A | 5/1998 | Agarwal |
| 5,774,685 A * | 6/1998 | Dubey ........................ 712/205 |
| 5,774,686 A | 6/1998 | Hammond |
| 5,778,241 A | 7/1998 | Bindloss |
| 5,781,750 A | 7/1998 | Blomgren |
| 5,790,877 A | 8/1998 | Nishiyama |
| 5,794,062 A | 8/1998 | Baxter |
| 5,805,907 A | 9/1998 | Loper |
| 5,805,915 A | 9/1998 | Wilkerson |
| 5,812,811 A | 9/1998 | Dubey |
| 5,822,606 A | 10/1998 | Morton |
| 5,848,290 A | 12/1998 | Yoshida |
| 5,854,934 A | 12/1998 | Hsu |
| 5,857,104 A | 1/1999 | Natarjan |
| 5,864,697 A | 1/1999 | Shiell |
| 5,864,707 A | 1/1999 | Tran |
| 5,870,581 A | 2/1999 | Redford |
| 5,872,987 A | 2/1999 | Wade |
| 5,875,324 A | 2/1999 | Tran |
| 5,875,464 A | 2/1999 | Kirk |
| 5,884,057 A | 3/1999 | Blomgren |
| 5,887,166 A | 3/1999 | Mallick |
| 5,903,750 A | 5/1999 | Yeh |
| 5,924,117 A | 7/1999 | Luick |
| 5,930,490 A | 7/1999 | Bartkowiak |
| 5,930,509 A | 7/1999 | Yates |
| 5,933,650 A | 8/1999 | van Hook |
| 5,933,860 A | 8/1999 | Emer |
| 5,946,222 A | 8/1999 | Redford |
| 5,949,995 A | 9/1999 | Freeman |
| 5,960,467 A | 9/1999 | Mahalingaiag |
| 5,966,544 A | 10/1999 | Sager |
| 5,991,857 A | 11/1999 | Koetje |
| 5,996,061 A | 11/1999 | Lopez-Aguado |
| 6,006,328 A | 12/1999 | Drake |
| 6,021,484 A | 2/2000 | Park |
| 6,044,469 A | 3/2000 | Horstmann |
| 6,049,330 A | 4/2000 | Redford |
| 6,052,703 A | 4/2000 | Redford |
| 6,058,469 A | 5/2000 | Baxter |
| 6,067,609 A | 5/2000 | Meeker |
| 6,067,622 A | 5/2000 | Moore |
| 6,076,158 A | 6/2000 | Sites |
| 6,078,745 A | 6/2000 | De Greef |
| 6,089,460 A | 7/2000 | Hazama |
| 6,105,139 A | 8/2000 | Dey |
| 6,108,775 A | 8/2000 | Shiell |
| 6,119,205 A | 9/2000 | Wicki |
| 6,121,905 A | 9/2000 | Redford |
| 6,130,631 A | 10/2000 | Redford |
| 6,175,892 B1 | 1/2001 | Sazzad |
| 6,178,498 B1 | 1/2001 | Sharangpani |
| 6,211,864 B1 | 4/2001 | Redford |
| 6,212,542 B1 | 4/2001 | Kahle |
| 6,216,223 B1 | 4/2001 | Revilla |
| 6,219,796 B1 | 4/2001 | Bartley |
| 6,256,743 B1 | 7/2001 | Lin |
| 6,272,512 B1 | 8/2001 | Golliver |
| 6,272,676 B1 | 8/2001 | Haghighat |
| 6,282,623 B1 | 8/2001 | Halahmi |

(56) References Cited

U.S. PATENT DOCUMENTS

| | | |
|---|---|---|
| 6,282,628 B1 | 8/2001 | Dubey |
| 6,282,639 B1 | 8/2001 | Puziol |
| 6,286,135 B1 | 9/2001 | Santhanam |
| 6,289,505 B1 | 9/2001 | Goebel |
| 6,292,879 B1 | 9/2001 | Fong |
| 6,301,705 B1 | 10/2001 | Doshi |
| 6,327,661 B1 | 12/2001 | Kocher |
| 6,334,175 B1 | 12/2001 | Chih |
| 6,341,371 B1 | 1/2002 | Tandri |
| 6,381,668 B1 | 4/2002 | Lunteren |
| 6,385,720 B1 | 5/2002 | Tanaka |
| 6,393,520 B2 | 5/2002 | Yoshikawa |
| 6,404,439 B1 | 6/2002 | Coulombe |
| 6,412,105 B1 | 6/2002 | Maslennikov |
| 6,430,674 B1 | 8/2002 | Trivedi |
| 6,430,693 B2 | 8/2002 | Lin |
| 6,446,181 B1 | 9/2002 | Ramagopal |
| 6,452,864 B1 | 9/2002 | Condemi |
| 6,473,339 B2 | 10/2002 | De Ambroggi |
| 6,477,646 B1 | 11/2002 | Krishna |
| 6,487,640 B1 | 11/2002 | Lipasti |
| 6,487,651 B1 | 11/2002 | Jackson |
| 6,502,188 B1 | 12/2002 | Zuraski, Jr. |
| 6,529,943 B1 | 3/2003 | Ohi |
| 6,539,543 B1 | 3/2003 | Guffens |
| 6,550,004 B1 | 4/2003 | Henry |
| 6,560,776 B1 | 5/2003 | Breggin |
| 6,571,331 B2 | 5/2003 | Henry |
| 6,574,740 B1 | 6/2003 | Odaohhara |
| 6,601,161 B2 | 7/2003 | Rappoport |
| 6,611,910 B2 | 8/2003 | Sharangpani |
| 6,625,740 B1 | 9/2003 | Datar |
| 6,643,739 B2 | 11/2003 | Van De Waerdt |
| 6,658,578 B1 | 12/2003 | Laurenti |
| 6,671,798 B1 | 12/2003 | Puziol |
| 6,675,305 B1 | 1/2004 | Mohammad |
| 6,687,838 B2 | 2/2004 | Orenstien |
| 6,732,253 B1 | 5/2004 | Redford |
| 6,772,323 B2 | 8/2004 | Krishnan |
| 6,795,781 B2 | 9/2004 | Aldridge |
| 6,813,693 B2 | 11/2004 | Chilimbi |
| 6,826,652 B1 | 11/2004 | Chauvel |
| 6,931,518 B1 | 8/2005 | Redford |
| 6,934,865 B2 | 8/2005 | Moritz |
| 6,970,985 B2 | 11/2005 | Moritz |
| 6,988,183 B1 | 1/2006 | Wong |
| 7,024,393 B1 | 4/2006 | Peinado |
| 7,036,118 B1 | 4/2006 | Ulery |
| 7,080,366 B2 | 7/2006 | Kramskoy |
| 7,089,594 B2 | 8/2006 | Lal |
| 7,162,617 B2 | 1/2007 | Ota |
| 7,185,215 B2 | 2/2007 | Cook |
| 7,278,136 B2 | 10/2007 | Moritz |
| 7,293,164 B2 | 11/2007 | DeWitt, Jr. |
| 7,299,500 B2 | 11/2007 | Klebe |
| 7,430,670 B1 | 9/2008 | Horning |
| 7,467,377 B2 | 12/2008 | Wu |
| 7,487,340 B2 | 2/2009 | Luick |
| 7,493,607 B2 | 2/2009 | Moritz |
| 7,564,345 B2 | 7/2009 | Devadas |
| 7,600,265 B2 | 10/2009 | Davydov |
| 7,613,921 B2 | 11/2009 | Scaralata |
| 7,639,805 B2 | 12/2009 | Li |
| 7,676,661 B1 | 3/2010 | Mohan |
| 7,996,671 B2 | 8/2011 | Chheda |
| 2001/0032309 A1 | 10/2001 | Henry |
| 2001/0037450 A1 | 11/2001 | Metlitski |
| 2001/0044891 A1 | 11/2001 | McGrath |
| 2001/0056531 A1 | 12/2001 | McFarling |
| 2002/0073301 A1 | 6/2002 | Kahle |
| 2002/0095566 A1 | 7/2002 | Sharangpani |
| 2002/0104077 A1 | 8/2002 | Charnell |
| 2002/0116578 A1 | 8/2002 | Sakai |
| 2003/0014742 A1 | 1/2003 | Seth |
| 2003/0041230 A1 | 2/2003 | Rappoport |
| 2003/0066061 A1 | 4/2003 | Wu |
| 2004/0010675 A1 | 1/2004 | Moritz |
| 2004/0010679 A1 | 1/2004 | Moritz |
| 2004/0010782 A1 | 1/2004 | Moritz |
| 2004/0010783 A1 | 1/2004 | Moritz |
| 2004/0015923 A1 | 1/2004 | Hemsing |
| 2004/0139340 A1 | 7/2004 | Johnson |
| 2004/0154011 A1 | 8/2004 | Wang |
| 2004/0158691 A1 | 8/2004 | Redford |
| 2004/0162964 A1 | 8/2004 | Ota |
| 2004/0205740 A1 | 10/2004 | Lavery |
| 2005/0055678 A1 | 3/2005 | Sakai |
| 2005/0066153 A1 | 3/2005 | Sharangpani |
| 2005/0108507 A1 | 5/2005 | Chheda |
| 2005/0114850 A1 | 5/2005 | Chheda |
| 2005/0154867 A1 | 7/2005 | DeWitt, Jr. |
| 2005/0172277 A1 | 8/2005 | Chheda |
| 2005/0210249 A1 | 9/2005 | Lee |
| 2005/0262332 A1 | 11/2005 | Rappoport |
| 2006/0179329 A1 | 8/2006 | Terechko |
| 2007/0294181 A1 | 12/2007 | Chheda |
| 2008/0126766 A1 | 5/2008 | Moritz |
| 2009/0300590 A1 | 12/2009 | Moritz |
| 2011/0258416 A1 | 10/2011 | Moritz |
| 2012/0102336 A1 | 4/2012 | Chheda |
| 2013/0145132 A1 | 6/2013 | Moritz |

FOREIGN PATENT DOCUMENTS

| | | |
|---|---|---|
| EP | 0679991 A1 | 11/1995 |
| EP | 0681236 A1 | 11/1995 |
| EP | 0945783 A2 | 9/1999 |
| GB | 2201015 | 8/1988 |
| JP | 10-289305 | 10/1998 |
| JP | 2002-7359 | 1/2002 |
| WO | 87/00318 A1 | 1/1987 |
| WO | 91/19269 A1 | 12/1991 |
| WO | 93/04438 A1 | 3/1993 |
| WO | 99/14685 A1 | 3/1999 |
| WO | 02/39271 A1 | 5/2002 |
| WO | 02/39272 A1 | 5/2002 |
| WO | 02/44895 A1 | 6/2002 |
| WO | 02/46885 A3 | 6/2002 |
| WO | 2004/006060 A2 | 1/2004 |
| WO | 2004/006060 A3 | 1/2004 |

OTHER PUBLICATIONS

Abstract Search, "SIMD Processor"; dated Mar. 21, 2003.

Actel Corporation, "Design Security in Nonvolatile Flash and Antifuse FPGAs Security Backgrounder" [online] Retrieved from the Internet: <URL://www.actel.com/documents/DesignSecurity_WP.pdf> [retrieved on Feb. 22, 2011] 2002.

Advanced Micro Devices, Inc., "Quantispeed™ Architecture"; *AMD White Paper*, Sunnyvale, CA (2001).

Aho et al., Compilers: Principles, Techniques and Tools, Addison-Wesley; Reading, MA; 1988.

Akkar et al., "An Implementation of DES and AES, Secure Against Some Attacks"; CHES2001, LNCS 2162; pp. 309-318 (2001).

Al-Tawil, K. et al., "Performance Modeling and Evaluation of MPI"; Journal of Parallel and Distributed Computing, vol. 61; pp. 202-223; 2001.

Anderson et al., "Physical Design of a Fourth-Generation Power GHz Microprocessor"; *Digest of Technical Papers, IEEE International Solid-State Circuits Conference*, pp. 232-233 and 451 (2001).

Anderson, L., "Program Analysis and Specialization for the C Programming Language"; PhD Thesis, DIKU, University of Copenhagen; May 1994.

ANSI x9.17, "American National Standard for Financial Institution Key Management (wholesale)"; Tech. Rep., American Bankers Assoc.; 1985.

Antoniou, A., "Digital Filters: Analysis, Design & Applications"; McGraw-Hill, New York, NY; 1993.

Aragon et al., "Power-aware Control Speculation Through Selective Throttling"; Proceedings of 9th International Symposium on High Performance Computer Architecture (HPCA) 2003.

(56) References Cited

OTHER PUBLICATIONS

ARM Architecture Reference Manual—ARM DDI 0100E; pp. A4-A28 and A4-A82; © 1996-2000.
Ashok et al., "Cool-Mem: Combining Statically Speculative Memory Accessing wit Selective Address Translation for energy Efficiency"; in Proceedings of the 10th International Conference on Architectural Support for Programming Language and Operating Systems (ASPLOS 2002); San Jose, CA; pp. 133-143, Oct. 2002.
Ashok et al., "Coupling Compiler-Enabled and Conventional Memory Accessing for Energy Efficiency"; ACM Transactions on Computer Systems; 22(2):180-213 (2004).
Ashok et al., "Network Software: From NCP to Ubiquitous Computing"; Encyclopedia of Life Support Systems; 2001.
Athanas et al., "Processor Reconfiguration Through Instruction-Set Metamorphosis"; IEEE/Computer Magazine, vol. 26(3); pp. 11-18-; 1993.
Babb et al., "Parallelizing Applications into Silicon"; The 7th Annual IEEE Symposium on Field-Programmable Custom Computing Machines; FCCM'99; Napa, CA; Apr. 1999.
Bahar et al., "Power and Energy Reduction Via Pipeline Balancing", *IEEE*, 12 pages (2001).
Banerjee et al., "Fast execution of loops with IF statements"; IEEE vol. 84; pp. 126-132; 1984.
Baniasadi et al., "Instruction Flow-Based Front-end Throttling for Power-Aware High Performance Processors", (ISLEPD '01), ACM, pp. 16-21 (2001).
Bechade et al., "A 32b 66 MHz 1.8W Microprocessor", *Digest of Technical Papers, IEEE*, pp. 208-209 (1994).
Bellas et al., "Architectural and Compiler Techniques for Energy Reduction in High-Performance Microprocessors"; IEEE Trans. On Very Large Scale Integration Systems, vol. 8(3); pp. 317-326; 2000.
Bellas, Nikolaos E., et al., Using Dynamic Cache Management Technique to Reduce Energy in General Purpose Processors; pp. 693-708; 2000.
Ben Naser, M., et al., "Data Memory Subsystem Resilient to Process Variations"; PhD Thesis; Jan. 2008.
Ben Naser et al., "A Step-by-Step Design and Analysis of Low Power Caches for Embedded Processors"; Boston Area Architecture Workshop (BARC-2005); Jan. 2005.
Ben Naser, M., "Designing Memory Subsystems Resilient to Process Variations"; IEEE Computer Society Annual Symposium on VLSI (ISVLSI 2007); Brazil, May 2007.
Ben Naser, M., "Power and Failure Analysis of Cam Cells Due to Process Variations"; Proc. Of 13th IEEE International conference on Electronics, Circuits and Systems (ICES'06), Nice, France; Dec. 2006.
Benini, et al., "A recursive Algorithm for Low-Power Memory Partitioning", (ISLPED '00), *ACM*, pp. 78-93 (2000).
Biham et al., "Differential Cryptanalysis of DES-like Cryptosystems"; J. Cryptology, vol. 4; pp. 3-72; 1991.
Brooks et al., "Wattch: A Framework for Architectural-Level Power Analysis and Optimizations"; Proceedings of the 27th International Symposium on Computer Architecture (ISCA '00): *ACM*; pp. 83-94 (2000).
Burger et al., "The SimpleScalar Tool Set, Version 2.0"; *Computer Sciences*Dept., Univ. of Wisconsin-Madison, *Technical Report* 1342, pp. 13-25 (1997).
Bursky, D., "Advance DRAM Architectures Overcome Data Bandwidth Limits"; Electron, Des., vol. 45; pp. 73-88 (1997).
Burtscher at al., "Static Load Classification for Improving the Value Predictability of Data-Cache Misses"; ACM, pp. 222-233; 2002.
Buyuktosunoglu et al., "An Adaptive Issue Queue for Reduced Power at High Performance" Power-Aware Computer Systems, First International Workshop, *PACS 2000*, pp. 25-39 (2000).
Calder et al., "Fast & Accurate Instruction Fetch and Branch Prediction", *IEEE*, pp. 2-11 (1994).
Calder et al., "Next Cache Line and Set Prediction"; Proceedings of the 1995 International Computer Symposium on Computer Architecture, *ACM*, pp. 287-296 (1995).

Cantin et al., "Cache Performance for Selected SPEC CPU2000 Benchmarks", *Computer Architecture News*, 29(4): 13-18 (2001).
Chang et al., "Protecting Software code by Guards"; Proc. ACM Workshop on Security and Privacy in Digital Rights Management (SPDRM); LNCS 2320; pp. 160-175; 2002.
Chase et al., "Lightweight Shares Objects in a 64-Bit Operating System"; Univ. of Washington, Dept. of Computer Science & Engineering, Technical Report 92-03-09; Seattle, WA; Jun. 1992.
Chheda et al., "Combining Compiler and Runtime IPC Predictions to Reduce Energy in Next Generation Architectures"; Proceedings of the First conference on computing Frontiers; Italy, pp. 240-254; Apr. 2004.
Chheda et al., "Memory Systems: Overview and Trends"; Encyclopedia of Life Support Systems; 2001.
Chiou et al., "Application-Specific Memory Management for Embedded Systems Using Software-Controlled Caches"; (DSC'00), *ACM*, pp. 416-419 (2000).
Cohn et al., "Optimizing Alpha Executables on Windows NT with Spike"; Digital Technical Journal, vol. 9(4); pp. 3-20; 1997.
Collins, L., "Power Drops Focus the Minds at Arm"; EE Times (2002) [online] Retrieved from the Internet: <URL: http://eetimes.eu/uk/16505609> [retrieved on Aug. 28, 2008].
Compaq Computer Corporation, "Compiler Writer's Guide for the Alpha 21264"; Digital Equipment Corporation© 1999.
Cooper et al., "Compiler-Controlled Memory"; ASPLOS VIII; *ACM*, 33(11):2-11 (1998).
Cortadella et al., "Evaluation of A +B =K Conditions Without Carry Propagation"; IEEE Trans. On Computers, vol. 41(11); pp. 1484-1488; Nov. 1992.
Cosoroba, A., "Double Data Rate synchronous DRAMS in High Performance Applications"; WESCON'97 IEEE Conference Proceedings; pp. 387-391 (1997).
Cowell et al., "Improved Modeling and Data-Migration for Dynamic Non-Uniform Cache Access"; in MDDS 2003 organized in conjunction with ISCA 2003.
Daemen et al., "The Rijndael Block Cipher—AES Proposal"; [online] Tech. Rep. [retrieved on Apr. 1, 2008] Retrieved from the internet: <URL:http://csrc.nist.gov/encryption/aes/round2/r2algs.htm> Mar. 9, 1999.
Deitrich et al., "Speculative Hedge Regulating Compile-time Speculation Against Profile Variation"; IEEE, pp. 70-79; 1996.
Desmet et al., "Improved Static Branch Prediction for Weak Dynamic Predictions"; Retrieved from the internet: <URL:http://escher.elis.ugent.be/publ/Edocs/DOCS/P103_085.pdf> pp. 1-3; Sep. 2003.
Folegnani et al., "Energy-Effective Issue Logic"; IEEE; 10 pages (2001).
Frank et al., "SUDS: Primitive Mechanisms for Memory Dependence Speculation"; Technical Report LCS-TM-591; Oct. 1998.
Furber et al., "ARM3-32b RISC Processor with 4 Kbyte On-Chip Cache"; VLSI '89; Elsevier; pp. 35-44 (1989).
Furber et al., "Power Saving Features in AMULET2e"; in Power Driven Microarchitecture Workshop at 25th Annual International Symposium on Computer Architecture; Barcelona, Spain; 4 pages (Jun. 1998).
Gandolfi et al., "Electromagnetic Analysis: Concert Results"; Workshop of Cryptographic Hardware and Embedded Systems (CHES'01); LNCS 2162; pp. 251-261; 2001.
Gassend et al., "Controlled Physical Random Functions"; Proc. 18th Ann. Computer Security Applications Conf. [online] Retrieved from the Internet: <URL:http://csg.csail.mit.edu/pubs/memos/Memo-457/memo-457.pdf> [retrieved on Feb. 22, 2011]; 2002.
Gilmont et al., "An Architecture of Security Management Unit for Safe Hosting of Multiple Agents"; Proc. Of the Int'l Workshop on Intelligent Communications and Multimedia Terminals [online] Retrieved from the Internet: <URL:http://citeseerx.ist.psu.edu/viewdoc/download?doi=10.1.1.140.6346&rep=rep1&type=pdf> [retrieved on Feb. 22, 2011]; Nov. 1998.
Gilmont et al., "Hardware Security for Software Privacy Support"; Electronics Lett., vol. 35(24); pp. 2096-2097; 1999.
Gowan et al., "Power Considerations in the Design of the Alpha 21264 Microprocessor" (DAC 98); *ACM*, pp. 726-731 (1998).
Grand, J., "Attacks on and Countermeasures for USB Hardware Token Devices"; Proc. 5th Nordic Workshop on Secure IT Systems

(56) References Cited

OTHER PUBLICATIONS

[online] Retrieved from the Internet: <URL:http://citeseerx.ist.psu.edu/viewdoc/download;jsessionid=98145A989F0A335F16702C1EA12F0819?doi=10.1.1.16.540&rep=rep1&type=pdf> [retrieved on Feb. 22, 2011]; 2000.
Grant et al., "Annotation-Directed Run-Time Specialization in C"; ACM; pp. 163-178 (undated).
Guo et al., "Compiler-Assisted Hardware-Based Data Prefetching for Next Generation Processors"; PhD Thesis; May 2007.
Guo et al., "Compiler-enabled Cache Management for Pointer-Intensive Programs"; Boston Area Architecture Workshop (BARC-2003); Jan. 2003.
Guo et al., "Energy Characterization of Hardware-Based Data Prefetching"; Proc. Of the IEEE Intl. conference on Computer Design (ICCD'04); pp. 518-523; Oct. 2004.
Guo et al., "Energy-Aware Data Prefetching for General-Purpose Programs"; Proc. Of PACS'04 Workshop on Power-Aware Computer Systems; Micro-37, to be appeared on Lecture notes in computer Science; Dec. 2004.
Guo et al., "PARE: A Power-Aware Data Prefetching Engine"; Proc. Of International Symposium on Low Power Electronics and Design (ISLPED'05); San Diego, CA; Aug. 2005.
Guo et al., "Runtime Biased Pointer Analysis and ITS Application on Energy Efficiency"; Proc. Of Workshop on Power-Aware Computer Systems (PACS'03) Micro-36; San Diego, CA; also in Lecture Note in Computer Science, vol. 3164; pp. 1-12; Springer 2004; ISBN 3-540-24031-4; Dec. 2003.
Guo et al., "Synchronization Coherence: A Transparent Hardware Mechanism for Cache Coherence and Fine-Grained Synchronization"; accepted by Journal of Parallel and Distributed Computing (JPDC) 2007.
Gutmann, P., "Data Remanence in Semiconductor Devices"; Proc. Of the 10th USENIX Security Symposium; 17 pages; 2001.
Gutmann, P., "Secure Deletion of Data from Magnetic and Solid-State Memory"; Proc. Of the 6th USENIX Security Symposium; 18 pages; 1996.
Heinrich, J., *MIPS R10000 Microprocessor's User Manual*, 2nd Ed., MIPS Technologies, Inc. (1996).
Heinrich, J., *MIPS R4000 Microprocessor User's Manual*, 2nd Ed., MIPS Technologies, Inc. (1994).
Hennessey et al., "Enhancing Vector Performance"; Computer Architecture, a Qualitative Approach, Second Edition, Section 5; pp. C23-C29; 1996.
Henry et al., "Circuits for Wide-Window SuperScalar Processors" (ISCA '00), *ACM*, pp. 236-247 (2000).
Hinton et al., "The Microarchitecture of the Pentium 4 Processor"; *Intel Technology Journal* Q1; pp. 1-12 (2001).
Huang et al., "L1 Data Cache Decomposition for Energy Efficiency" (ISLPED '01), *ACM*, pp. 10-15 (2001).
Huang et al., "Speculative Disambiguation: A Compilation Technique for Dynamic Memory Disambiguation"; IEEE, pp. 200-210; 1994.
IBM "Single-Bit Processor Enable Scheme"; IBM Technical Disclosure Bulletin, vol. 29, No. 11; pp. 5016-5017; Apr. 1987.
Inoue et al., "Way-Predicting Set-Associate Cache for High Performance and Low Energy Consumption"; (ISLPED '99), *ACM*, pp. 273-275 (1999).
Intel 80386 Programmer's Reference Manual; 1986.
Intel, "Intel® StrongARM* SA-1110 Microprocessor"; SA-1110 *Brief Datasheet*; pp. 1-9; (2000).
International Preliminary Report on Patentability in application PCT/US2003/021076; mailed Sep. 16, 2004. (no. of pages?).
International Search Report for PCT/US2003/020999 mailed Oct. 10, 2003; 3 pages.
International Search Report for PCT/US2003/021120 dated Jul. 30, 2004; 3 pages.
Itoh et al., "DPA Countermeasure Based on 'Masking Method'"; ICICS 2001; LNCS 2288; pp. 440-456 (2002).
Jain et al., "A 1.2Ghz Alpha Microprocessor with 44.8GB/s Chip Pin Bandwidth"; IEEE; pp. 240-241 (2001).
Kaxiras et al., "Cache Decay: Exploiting Generational Behavior to Reduce Cache Leakage Power"; *IEEE*, pp. 240-0251 (2001).
Kean, T., "Secure Configuration of Field-Programmable Gate Arrays"; Proc. Of the 11th Int'l Conf. on Field-Programmable Logic and Applications [online] Retrieved from the Internet: <URL:http://citeseerx.ist.psu.edu/viewdoc/download?doi=10.1.1.86.2017&rep=rep1&type=pdf> [retrieved on Feb. 22, 2011]; 2001.
Kelsey et al., "Side channel Cryptanalysis of Product Ciphers"; Proc. ESORICS'98; pp. 97-110; 1998.
Kever et al., "A 200MHz RISC Microprocessor with 128kB On-Chip Caches"; *IEEE*; pp. 410, 411 and 495 (1997).
Kim et al., "Partitioned Instruction Cache Architecture for Energy Efficiency"; ACM Trans on Embedded Computing Systems, vol. 2(2); pp. 163-185; May 2003.
Kim et al., "Predictive Pre-charging for Bitline Leakage Energy Reduction"; 15th Annual IEEE Int'l ASIC/SOC Conference; pp. 36-40; 2002.
Kin et al., "The Filter Cache: An Energy Efficient Memory Structure"; *IEEE*, pp. 184-193 (1997).
Kocher et al., "Differential Power Analysis"; CRYPTO'99, LNCS 1666; 10 pages; 1999.
Kocher et al., "Timing Attacks on Implementations of Diffie-Hellmann, RSA, DSS and Other Systems"; Adv. In Cryptology (CRYPT0'96); 10 pages; 1996.
Kommerling et al., "Design Principles for Tamper-Resistant Smartcard Processors"; USENIX Workshop on Smartcard Technology; 12 pages; 1999.
Kowalczyk et al., "First-Generation MACJC Dual Processor"; *IEEE*, pp. 236-237 and 451 (2001).
Kuhn et al., "Soft Tempest: Hidden Data Transmission Using Electromagnetic Emanations"; Proc. Of 2nd Int'l Workshop on Information Hiding [online] Retrieved from the Internet: <URL:http://www.cl.cam.au.ukt/~mgk25/ih98-tempest.pdf> [retrieved on Feb. 22, 2011]; 1998.
Kuhn et al., "Tamper Resistance—A Cautionary Note"; Proc. Of the 2nd USENIX Workshop on Electronics Commerce; 11 pages; 1996.
Kuhn, M., "Optical Time-Domain Eavesdropping Risk of CRT Displays"; Proc. Of the 2002 IEEE Symposium on Security and Privacy [online] Retrieved from the Internet: <URL:http://www.cl.cam.ac.uk/~mgk25/ieee02-optical.pdf> [retrieved on Feb. 22, 2011]; May 2002.
Lam et al., "Limits of Control Flow on Parallelism"; *ACM*, pp. 46-57 (1992).
Larson et al., "Exploiting Superword Level Parallelism with Multimedia Instruction Sets"; (PLDI '00), *ACM*, pp. 145-156 (2000).
Lee et al., "Region-Based Caching: An Energy-Delay Efficient Memory Architecture for Embedded Processors"; (CASES '00) *ACM*, pp. 120-127 (2000).
Leenstra et al., "A 1.8 GHz Instruction Buffer"; *IEEE*, pp. 314-315 and 459 (2001).
Levinthal et al., "Chap—A SIMD Graphics Processor"; Computer Graphics, vol. 18(3); Jul. 1984.
Lie et al., "Architecture Support for Copy and Tamper Resistant Software"; Proc. Of the 6th Int'l Conf. Architecture Support for Programming Language and Operating Systems; ACM; 10 pages; 2000.
Loughry et al., "Information Leakage from Optical Emanations"; ACM Trans. On Information and System Security, vol. 5(3); 28 pages; 2002.
MAC OS Runtime Architecture for System 7 Through MAC OS 9, Ch. 7 [online] Retrieved from the Internet: <URL:http://developer.apple.com/documentation/mac/pdf/MacOS_RT_Architectures.pdf> [retrieved on Aug. 13, 2009] Published Jan. 31, 1997; © Apple Inc.
Manne et al., "Pipeline Gating: Speculation Control for Energy Reduction"; *IEEE*, pp. 132-141 (1998).
Marculescu, D., "Profile-Driven Code Execution for Low Power Dissipation" (ISPLED '00); *ACM*, pp. 253-255 (2000).

(56) References Cited

OTHER PUBLICATIONS

Maro et al., "Dynamically Reconfiguring Processor Resources to Reduce Power Consumption in High-Performance Processors, Workshop on Power-Aware computer Systems" (PACs '00/LNCS 2008) *ACM*, pp. 97-111 (2001).

Memik et al., "A Selective Hardware/Compiler Approach for Improving Cache Locality" Center for Parallel and Distributed Computing, Northwestern University; pp. 1-21 (2000).

Menezes et al., "Handbook of Applied Cryptography"; CRC Press (CRC Press Series on Discrete Mathematics and Its Applications) 1997.

Messerges et al., "Examining Smart Card Security Under the Threat of Power Analysis Attacks"; IEEE Trans. On Computer, vol. 51(5); pp. 541-552; 2002.

Michaud et al., "Data-Flow Prescheduling for Large Instructions Windows in Out-of-Order Processors, 7th International"; *IEEE*, pp. 2736 (2001).

MICRO-34, Proc. Of the 34th Annual Int'l Symposium on Microarchitecture; IEEE Computer Society #PR01369; Austin, TX; 2001.

Milutinovic et al., "The Split Temporal/Spatial Cache: Initial Performance Analysis"; Proceedings of the SCIzzL-5, 8 pages (1996).

Mirsky et al., "MATRIX: A Reconfigurable Computing Architecture with Configurable Instruction distribution and Deployable Resources"; Proc. Of the IEEE Symposium of FPGSs for Custom Computing Machines; pp. 157-166 (1996).

Montanaro et al., "A 160 MHz, 32b, 0.5-W CMOS RISC Microprocessor"; *IEEE*, 31(11): 1703-1714 (1996).

Moritz et al., "Adaptive Distributed Software Virtual Memory for Raw"; Laboratory for Computer Science, Raw Group, MIT; Cambridge; Jan. 1999.

Moritz et al., "Exploring Cost-Performance Optimal Designs of Raw Microprocessors"; The 6th Annual IEEE Symposium on field-Programmable Custom Computing Machines FCCM'98; Napa, CA; Apr. 1998.

Moritz et al., "Fault-Tolerant Nanoscale Processors on Semiconductor Nanowire Grids"; IEEE Transactions on Circuits and Systems I, special issue on Nanoelectronic Circuits and Nanoarchitectures, vol. 54, iss. 11; pp. 2422-2437; Nov. 2007.

Moritz et al., "Hot Pages: Design and Implementation of Software Caching for Raw"; IBM Research Lab Austin; May 1999.

Moritz et al., "Hot Pages: Software Caching for Raw Microprocessors"; International Symposium for Computer Architecture (ISCA-27); Massachusetts Institute of Technology, Cambridge, MA; pp. 1-12; 1999.

Moritz et al., "Latching on the Wire and Pipelining in Nanoscale Designs"; 3rd Workshop on Non-silicon Computation (NSC-3), ISCA'04; Germany; Jun. 2004.

Moritz et al., "LoGPC: Modeling Network Contention in Message-Passing Programs"; ACM Joint International Conference on Measurement and Modeling of Computer Systems, ACM Sigmetrics/Performance 98 Wisconsin Madison; Jun. 1998; also in ACM Performance Evaluation Review Special Issue vol. 26. No. 1.

Moritz et al., "LoGPC: Modeling Network Contention in Message-Passing Programs"; IEEE Transaction son Parallel and Distributed Systems, vol. 12, No. 4; pp. 404-415; Apr. 2001.

Moritz et al., "Security Tradeoffs in NEST"; DARPA Presentation; Dec. 2003.

Moritz et al., "SimpleFit: a Framework for Analyzing Design Tradeoffs in Raw Architectures"; IEEE Transactions on Parallel and Distributed Systems, vol. 12, No. 7; pp. 730-743; Jul. 2001.

Moritz et al., "Towards Defect-tolerant Nanoscale Architectures"; Incited Paper, IEEE Nano; 2006.

Mueller et al., "Predicting Instruction Cache Behavior"; ACM SIGPLAN Workshop on Language, Compiler Tool Support for Real-Time Systems; Jun. 2004.

Narayanan et al., "CMOS Control Enabled Single-Type FET NASIC"; IEEE Computer Society Annual Symposium on VLSI (2008).

Narayanan et al., "Comparison of Analog and Digital Nano-Systems: Issues for the Nano-Architect"; IEEE International Nanoelectronics Conference (INEC) 2008.

Narayanan et al., "Image Processing Architecture for Semiconductor Nanowire based Fabrics"; accepted by IEEE 8th International Conference on Nanotechnology; 2008.

National Bureau of Standards, "Data Encryption Standard"; Tech. Rep. NBS FIPS Pub. 46, Nat'l Bur. Standards, US Dept. of Commerce; Jan. 1977.

Nicolau et al., "Measuring the Parallelism Available for Very Long Instruction Word Architecture"; *IEEE Transactions on Computers*; 33(11); 968-976; 1984.

Oppenheim, A., "Discrete-Time Signal Processing"; Prentice-Hall, Upper Saddle River, NJ; 1999.

Ors et al., "Power-Analysis Attack on an ASIC AES Implementation"; Proc. Of Int'l Symp. On Information Tech. [online] Retrieved from the Internet: <URL:http://citeseerx.ist.psu.edu/viewdoc/download?doi=10.1.1.88.2697&rep=rep1&type=pdf> [retrieved on Feb. 22, 2011]; ITCC 2004.

Palacharla et al., "Complexity-Effective Superscalar Processors"; (ISCA '97) *ACM*, pp. 206-218 (1997).

Panda et al., "Efficient Utilization of Scratch-Pad Memory in Embedded Processor Applications"; IEEE; pp. 7-11 (1997).

Parikh et al., "Power Issues Related on Branch Prediction"; (HPCA'02) IEEE; 12 pages (2002).

Pering et al., "Dynamic Voltage Scaling and the Design of a Low-Power Microprocessor System"; In Power Driven Microarchitecture Workshop; attached to ISCA98; UC Berkeley, electronics Research Laboratory (Jun. 1998).

Polegnani et al., "Energy-Effective Issue Logic"; IEEE; 10 pages (2001).

Ponomarev et al., "Reducing Power Requirements of Instruction Scheduling through Dynamic Allocation of Multiple Datapath Resources"; IEEE; pp. 90-101 (2001).

Powell et al., "Reducing Set-Associative Cache Energy via Way-Prediction and Selective Direct-Mapping"; IEEE; pp. 54-65 (2001).

PowerPC Upgrade FAQ, Powerbook 500 Series PPC Upgrade from IMAX [online] Retrieved from the Internet: <URL:http://www.darryl.com/ppcfaq.html> [retrieved on Aug. 13, 2009]; dated Jan. 28, 1997.

Prasad et al., "Efficient Search Techniques in the Billion Transistor Era"; Invited paper, appears in PDPTA, Las Vegas, NV; 2001.

Qi et al., "A Unified Cache Coherence and Synchronization Protocol"; Boston Area Architecture Workshop (BARC-2004); Jan. 2004.

Quisquater et al., "Electromagnetic Analysis (EMA) Measure and Counter-Measures for Smart Cards"; E-smart 2001, LNCS 2140; pp. 200-201; 2001.

Ramirez et al., "Branch Prediction Using Profile Data"; Springer-Verlag Berlin Heidelberg; pp. 386-394 (2001).

Ranganathan et al., "Reconfigurable Caches and their Application to Media Processing"; (ISCA '00) ACM; pp. 214-224 (2000).

Rao et al., "EMPowering Side-Channel Attacks"; IBM Research Ctr. [online] Retrieved from the Internet: <URL:http://eprint.iacr.org/2001/037.pdf> [retrieved on Feb. 22, 2011]; May 2001.

Reinman et al., "An Integrated Cache Timing and Power Model"; COMPAQ Western Research Lab; pp. 1-20 (1999).

Rugina et al., "Pointer Analysis for Multithreaded Programs"; Proc. Of SIGPLAN'99 Conf. on Program Language Design and Implementation (May 1999).

Sanchez, Jesus F., et al., Static Locality Analysis for Cache Management; pp. 261-271; 1997.

Schlansker et al., "Achieving high Levels of Instruction-Level Parallelism with Reduced Hardware Complexity"; Hewlitt Packard Laboratories (HP-96-120); pp. 1-85 (1994).

Schneier et al., "Applied Cryptography, 2nd Ed."; John Wiley & Sons, Inc., (pub.); pp. 13 and 270-278; 1996.

Schwartz et al., "Disassembly of Executable Code Revisited"; Proc. 9th Working Conf. on Reverse Engineering (WCRE'02); 10 pages; 2002.

Simunie et al., "Source Code Optimization and Profiling and Energy Consumption in Embedded System"; Proc. 13th Int'l Symposium on System Synthesis; pp. 193-198 (2000).

(56) References Cited

OTHER PUBLICATIONS

Singh et al., "Short Range Wireless Connectivity for Next Generation Architectures" in PDPTA, Las Vegas, NV; 2001.
Skorobogatov et al., "Optical Fault Induction Attacks"; Proc. Of Cryptographic Hardware and Embedded Systems (CHES'02); LNCS 2523; pp. 2-12; 2003.
Skorobogatov, S., "Breaking Copy Protection in Microcontrollers"; [online] Retrieved from the Internet: <URL:http://www.cl.cam.ac.uk/~sps32/mcu_lock.html>; retrieved on Feb. 22, 2011; 2000.
Skorobogatov, S., "Data Remanence in Flash Memory Devices"; Proc. Of Cryptog. Hardware and Embedded Systems (CHES2005) [online] Retrieved from the Internet: <URL:http://s3.amazonaws.com/ppt-download/data-remanence-in-flash-memory-devices1949.pdf?response-content-disposition=attachment&Signature=p51Xjx2Qcu760LiE02jwBVQHYCo%3D&Expires=1298390877&AWSAccessKeyId=AKIAJLIT267DEGKZDHEQ> [retrieved on Feb. 22, 2011] 2005.
Skorobogatov, S., "Tamper Resistance and Physical Attacks"; Summer School on Crytpographic Hardware, Side-Channel and Faulty Attacks (ECRYPT-2006), Jun. 12-15, 2006; Louvain-la-Neuve [online] Retrieved from the Internet: <URL:http://www.cl.cam.ac.uk/~sps32/#Publications> [retrieved on Feb. 22, 2011]; 2006.
Sohi et al., "Instruction Issue Logic for High-Performance, Interruptable Pipelined Processors"; AMC; pp. 27-34 (1987).
Srivastav et al., "Atom: A System for Building Customizer Program Analysis Tools"; Proc. Of ACM SIGPLAN '94 Conf. on Programming Language Design and Implementation; pp. 196-205; 1994.
Steensgard, B., "Points-to Analysis in Almost Linear Time"; POPL'96 (1996).
Steinke et al., "Reducing Energy Consumption by Dynamic Copying of Instructions onto Onchip Memory"; Proc. Of the 15th Int'l Symposium on System Synthesis; pp. 213-218; 2002.
Telikepalli, A., "Is Your FPGA Design Secure?"; XCELL Journal [online] Retrieved from the Internet: <URL:http://cdserv1.wbut.ac.in/81-312-0257-7/Xininx/files/Xcell%20Journal%20Articles/xcell_47/xc_secure47.pdf> [retrieved on Feb. 22, 2011]; 2003.
The Standard Performance Evaluation Corporation, http://www.spec.org (200 2002).
Trichina et al., "Secure AES Hardware Module for Resource Constrained Devices"; ESAS 2004, Lec. Notes in CompSci 3313 [online] Retrieved from the Internet: <URL:http://citeseerx/ist.psu.edu/viewdoc/download?doi=10.1.1.95.6712&rep=rep1&type=pdf> [retrieved Feb. 22, 2011] 2005.
Tune et al., "Dynamic Predictions of Critical Path Instructions"; IEEE; pp. 185-195 (2001).
Tygar at al., "Dyad: A System for Using Physically Secure Coprocessors"; Tech. Rep. CMU-CS-91-140R; Carnegie Mellon University; 38 pages; 1991.
Unnikrishnan et al., "Dynamic Compilation for Energy Adaption"; IEEE/ACM Int'l Conf. on Computer-Aided Design; 2002.
Unsal et al., "An Analysis of Scalar Memory Accesses in Embedded and Multimedia Systems"; High Performance Memory Systems; Springer-Verlag; 2003.
Unsal et al., "Cool-Cache for Hot Multimedia" in Proc. Of the 34th Annual International Symposium on Microarchitecture (MICRO-34); Austin, TX; pp. 274-283; Dec. 2001.
Unsal et al., "Cool Cache: A Compiler-Enabled Energy Efficient Data caching Framework for Embedded/Multimedia Processors"; ACM Transactions on Embedded Computer Systems; 2(3): 373-392 (2003).
Unsal et al., "Cool-Fetch: A Compiler-Enabled IPC Estimation-Based Framework for Energy Reduction"; Interact; Feb. 8, 2004.
Unsal et al., "Cool-Fetch: Compiler-Enabled Power-Aware Fetch Throttling"; IEEE Computer Architecture Letters, vol. 1, 2002.
Unsal et al., "High-Level Power-Reduction Heuristics for Embedded Real-Time Systems"; University of Massachusetts; p. 1-6 (2000).
Unsal et al., "On Memory Behavior of Scalars in Embedded Multimedia Systems"; University of Massachusets; pp. 1-12 (2001).
Unsal et al., "Power-Aware Replication of Data structures in Distributed Embedded Real-Time Systems"; IPDPS 2000 Workshops; pp. 839-846.
Unsal et al., "The Minimax Cache: An Energy Efficient Framework for Media Processors"; IEEE; pp. 131-140 (2002).
van Eck, W., "Electronic Radiation from Video Display Units: An Eavesdropping Risk?"; Computer & Security [online] Retrieved from the Internet: <URL:http://jya.com/emr.pdf> [retrieved on Feb. 22, 2011] 1985.
Vinciguerra et al., "An Experimentation Framework for Evaluating Disassembly and Decompilation Tools for C++ and Java"; IEEE Proc. Of the 10th Working Conf. On Reverse Engineering (WCRE'03); 10 pages; 2003.
Voronin, A. "Data Storage on Hard Disks" [online] Retrieved from the Internet: <URL: http://www.digit-life.com/articles/bootman/index.html> [retrieved Aug. 27, 2008].
Wall, David W., "Limits of Instruction-Level Parallelism"; ACM; pp. 176-188 (1991).
Wang et al., "Combining 2-Level Logic Families on Grid-based Nanoscale Fabrics"; IEEE/ACM Symposium on Nanoscale Architectures (NanoARch'07); Oct. 2007.
Wang et al., "Combining Circuit Level and System Level Techniques for Defect-Tolerant Nanoscale Architectures"; 2nd IEEE International workshop on Defect and Fault Tolerant Nanoscale Architectures (NanoArch 2006); Boston, MA; Jun. 2006.
Wang et al., "Compiler-Based Adaptive Fetch Throttling for Energy Efficiency"; Proc. Of the 2006 IEEE International Symposium on Performance analysis of Systems and Software (ISPASS'06); Austin, TX; Mar. 2006.
Wang et al., "NASICs: A Nanoscale Fabric for Nanoscale Microprocessors"; IEEE International Nanoelectronics Conference (INEC); 2008.
Wang et al., "Opportunities and Challenges in Application-Tuned Circuits and Architectures Based on Nanodevices"; Proc. Of the First Conference on Computing Frontiers; pp. 503-511; Italy; Apr. 2004.
Wang et al., "Self-Healing Wire-Streaming Processors on 2-D Semiconductor Nanowire Fabrics"; NSTI (Nano Science and Technology Institute) Nanotech 2006; Boston, Mal May 2006.
Wang et al., "Wire-Streaming Processors on 2-D Nanowire Fabrics" NSTI (Nano Science and Technology Institute); Nanotech 2005; California; May 2005.
Wang, T. "Exploring Nanoscale Application-Specific Ics and Architectures"; Boston Area Architecture Workshop (BARC-2004); Jan. 2004.
Weber "Hammer: The Architecture AMD's of Next-Generation Processors"; Microprocessor Forum (2001).
Weingart et al., "Physical Security Devices for Computer Subsystems: A Survey of Attacks and Defenses"; Workshop on Cryptographic Hardware and Embedded Systems (CHES2000), LNCS 1965; pp. 302-317; 2000.
White, R., "How Computers Work"; Millennium Edition, Que Corporation; p. 36; 1999.
Wikipedia entry for "context switch" [online] Retrieved from the internet: <URL:http://en.wikipedia.org/w/index.php?title=context_switch&oldid=244184> Retrieved on Aug. 13, 2009 [Pub. Oct. 26, 2001].
Wilson et al., "Efficient Context-Sensitive Pointer Analysis for C Programs"; Proc. ACM SIGPLAN'95 conf. On Programming Language Design and Implementations; Jun. 1995.
Wilton et al., "CACTI: An Enhanced Cache Access and Cycle Time Model"; IEEE—Journal of Solid-State Circuits, 31(5):677-688 (1996).
Witchel, E., "Direct Addressed Caches for Reduced Power Consumption"; IEEE pp. 124-133 (2001).
Wollinger et al., "How Secure are FPGAs in Cryptographic Applications"; Proc. Of the 13th Int'l Conf. On Field-Programmable Logic and Applications (FPL-2003); 11 pages; 2003.
Wollinger et al., "Security on FPGAs: State of the Art Implementations and Attacks"; ACM Transactions on Embedded Computing Systems (TECS) TECS Homepage archive, vol. 3, Iss. 3 [online] Retrieved from the Internet: <URL:http://www.wollinger.org/pa-

(56) References Cited

OTHER PUBLICATIONS pers/Wollingeretal_ACMTransEmbed-dedsysFPGACryptoOverview.pdf> [retrieved on Feb. 22, 2011; Aug. 2004.

Yang et al., "An Integrated Circuit/Architecture Approach to Reducing Leakage in Deep-Submicorn High-Performance I-Caches"; IEEE; pp. 147-157 (2001).

Young et al., "Improving the Accuracy of Static Branch Prediction Using Branch Correlation"; ACM; pp. 232-241; 1994.

Zhang et al., "Compiler Support for Reducing Leakage Energy Consumption" Proc. Of the Design, Automation and Test in Europe Conference and Exhibition [Date'03]; Mar. 2003.

Zhang et al., "Highly-Associative Caches for Low-Power Processors"; Kool Chips Workshop, 33rd International Symposium on Microarchitecture; 6 pages (2000).

Zyuban et al., "Inherently Lower-Power High-Super-Performance Superscalar Architectures"; IEEE Transactions on Computer; 50(3): 268-285 (2001).

\* cited by examiner

| | |
|---|---|
| ADPCM | Adaptive differential pulse-coded modulation for audio coding |
| RASTA | Speech recognition front-end processing |
| EPIC | Wavelet decomposition-based Image compression code |
| G721 | Voice compression coder based on the G.711, G.721 and G.723 standards |
| JPEG | Lossy image compression decoder |
| MPEG2 | Lossy motion video compression decoder |
| AMMP | Computational chemistry |
| ART | Neural network for object recognition in a thermal image |
| EQUAKE | Simulation of seismic wave propagation |
| PARSER | Word processing, synthetic English parser |
| VPR | FPGA circuit placement and routing |

Fig. 11

STATICALLY SPECULATIVE COMPILATION AND EXECUTION

RELATED APPLICATION

This application is a continuation (and claims the benefit of priority under 35 USC 120) of U.S. application Ser. No. 13/669,687, filed on Nov. 6, 2012, which is a continuation of U.S. application Ser. No. 13/033,159, filed Feb. 23, 2011, which is a continuation of U.S. application Ser. No. 12/347,252, filed Dec. 31, 2008, which is a continuation of U.S. application Ser. No. 10/191,646, filed Jul. 9, 2002 (now U.S. Pat. No. 7,493,607). The disclosures of U.S. application Ser. No. 13/669,687, U.S. application Ser. No. 13/033,159, U.S. application Ser. No. 12/347,252 and of U.S. application Ser. No. 10/191,646 are considered part of (and are incorporated by reference in) the disclosure of this application.

FIELD OF THE INVENTION

This invention relates to power and energy consumption in computer systems.

BACKGROUND OF THE INVENTION

Power/energy consumption has increased significantly with every chip generation. With the reduced transistor sizes in modern processors, the per area power density is approaching that of a nuclear reactor. Consequently, power reduction has become a design goal, with power saving features widely recognized as representing the next phase in the advancement of microprocessors. Portability and reliability requirements of emerging applications further underline this trend.

Major processor vendors realize that they must compete in terms of the power consumption of their chips as well as chip speed. Typical approaches to reduce power consumption (e.g., by reducing supply voltage and/or clock rate) negatively impact performance. Other approaches do not scale between design generations (e.g., as clock rates increase, due to changed critical paths, the value of many circuit or microarchitecture based energy reduction approaches is reduced).

The challenge is to reduce the energy consumed in processors without sacrificing performance, and with solutions that scale between processor generations. With increased Internet usage and growing desire for wireless communications, the processor market is being driven to produce smaller and more powerful chips that do not drain significant amounts of power.

SUMMARY OF THE INVENTION

The aforementioned problems are addressed by the present invention. The concepts introduced are broad and present chip-wide energy reduction optimization opportunities. The particular embodiments described provide application adaptive and scalable solutions to energy-reduction in memory systems.

A wide-range of compiler and microarchitectural techniques are presented, that improve the energy efficiency of processors significantly, without affecting performance (in many cases performance can be improved). The scope of the invention includes, but is not limited to, both embedded as well as general-purpose processor designs.

In the methods described, energy consumption is reduced by (1) extracting and exposing static information to control processor resources at runtime, (2) exploiting speculative static information in addition to predictable static information, and (3) adding compiler managed static and static-dynamic execution paths (i.e., architectural components), that can also be integrated into conventional mechanisms and that leverage this static information.

Speculative compiler analysis, as an underlying compilation approach, reduces the complexity of otherwise highly sophisticated analysis techniques (e.g., flow-sensitive and context-sensitive alias analysis), and expands their scope to large and complex applications.

The methods presented are based on a combined compiler-microarchitecture approach, and, more specifically, statically speculative compilation and execution, and provide a unified and scalable framework to reduce energy consumption adaptively, with minimal or no performance impact, or performance improvement for many important applications (e.g., image compression and video processing).

The invention can be used to save energy on any type of device that includes a processor. For example, the invention can be used to save energy on personal computers, devices containing embedded controllers, and hand-held devices, such as PalmPilots and cellular telephones.

In general, in one aspect, the invention is a method, for use with a compiler architecture framework, which includes performing a statically speculative compilation process to extract and use speculative static information, encoding the speculative static information in an instruction set architecture of a processor, and executing a compiled computer program using the speculative static information. Executing supports static speculation driven mechanisms and controls. This aspect may include one or more of the following features.

Executing may include controlling at least some processor resources using the speculative static information encoded in the instruction set architecture. Executing may include operating processor-related mechanisms using the speculative static information encoded in the instruction set architecture. Executing may include static, static-dynamic, and dynamic execution paths. The speculative static information may include information about one or more of processor resource demands and information that contributes to determining processor resource demands.

The instruction set architecture may include at least one of modified and additional instructions to propagate information through code and to store the information. The compilation process may expose speculative static information to run time layers, and the microarchitecture which performs the executing may provide a mechanism to recover in case of static misprediction. The compilation process may extract the speculative static information and performs compilation using the speculative static information to reduce power consumption in the processor. The speculative static information may include predictable static information and additional static information that is speculated based on the predictable static information.

Executing may be performed by microarchitecture that contains an extension. The extension may support correctness of execution for performing the statically speculative compilation process. The extension is comprised of hardware and/or software.

The compilation process may perform static speculation. The static speculation determines information about execution of the computer program. The static speculation may be controlled on an application-specific and adaptive basis and may be managed with compile-time flags. The compilation process may determine processor performance and energy tradeoffs during compile-time and may use the tradeoffs during execution. The compilation process may perform design objective customization without changing the microarchitecture.

More information about processor resource usage is exposed with speculative static compilation than with predictable static information. The microarchitecture may perform the executing using the speculative static information and dynamic information during execution.

This aspect may be used in a silicon-based electronics system, a nano-electronics based electronic system, or any other appropriate system.

In general, in another aspect, the invention is directed to a processor framework that includes a compiler which compiles a computer program, the compiler extracting speculative static information about the computer program during compilation, and a tagless cache architecture that is accessed based on the extracted speculative static information. This aspect may include one or more of the following.

The speculative static information may be used to register promote cache pointer information. The speculative static information may be used to select cache pointers at run time. The processor framework may also include at least one of a scratchpad-memory based cache mechanism and an associative cache.

The compiler may select which of plural cache accesses are mapped to which cache mechanisms based on the speculative static information. Frequently used data with a low memory footprint may be mapped to the scratchpad-memory based cache mechanism. Associativity and block size in the tagless cache may be logical and programmable. The compiler may determine block sizes and associativity of a cache based on an analysis of the computer program.

The processor framework may include a memory area for storing a cache pointer. The processor framework may include a Cache TLB (Translation Look-ahead Buffer) for capturing statically mispredicted cache pointers and other types of cache pointers. The Cache TLB may include eight entries. The processor framework may include a microarchitecture for use in accessing the tagless cache. The microarchitecture may access the tagless cache using at least one of static, static-dynamic, and dynamic cache access paths.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In addition, the materials, methods, and examples are illustrative only and not intended to be limiting.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 11 is a list of programs evaluated with the embodiments described herein.

DETAILED DESCRIPTION

Figure 1:
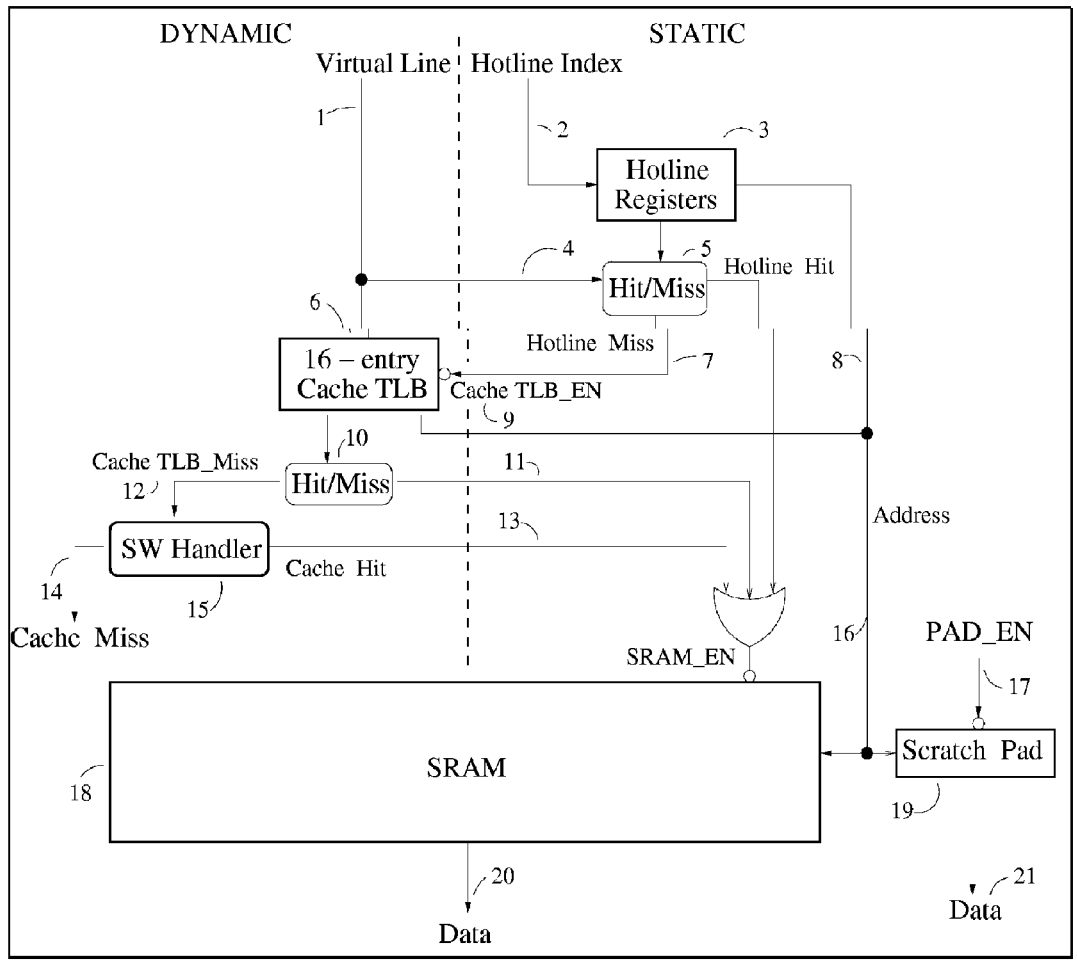
FIG. 1 is a block diagram showing a Tag-less (tagless) Cache architecture, which is an example implementation of the microarchitecture described in the first embodiment.

The problem of energy reduction without performance impact is addressed by the present invention. Power and energy consumption are reduced by methods incorporated at compile-time and at runtime, in both hardware and software layers. The methods include compiler level, instruction set architecture (ISA), and micro-architectural components/techniques.

A compiler is software (i.e., machine executable instructions stored in a memory system) that translates applications from high-level programming languages (e.g., C, C++, Java) into machine specific sequences of instructions. The ISA is a set of rules that defines the encoding of operations into machine specific instructions. A program is a collection of machine level instructions that are executed to perform the desired functionality. Micro-architectural (or architectural) components refer to hardware and/or software techniques that are used during execution of the program. The actual machine can be a microprocessor or any other device that is capable of executing instructions that conform to the encoding defined in the ISA. A memory area can be any area that can store bits, e.g., registers, cache, and some type Random Access Memory (RAM).

Compile-time refers to the time during which the program is translated from a high level programming language into a machine specific stream of instructions, and it is not part of the execution or runtime. Runtime is the time it takes to execute the translated machine instructions on the machine. Machine energy in the targeted apparatus is only consumed during runtime. Compilation is typically done on a different host machine.

Information in the context of this invention refers to either information collected during compilation or during execution. Information collected during compilation is called static or compile time information. Information collected during runtime is called runtime or dynamic information. Program analysis refers to the process during compile time that analyzes the program and extracts static information. Program transformation/optimization is the process during compile time that modifies the program typically to achieve some objective such as improve performance.

Static information is defined to be predictable if it can be shown during compilation that the information is true for any possible input set applied to the program, or for any possible execution of the program on the machine in question. Static information is defined to be speculative if the information extracted during compile time is not shown or cannot be shown to be true for all possible execution instances. As such, the available (i.e., extractable) speculative static information is a superset of the available predictable static information in a program.

An energy optimization is called dynamic if it uses dynamic information. It is called static if it uses static information.

The methods described herein address opportunities that appear at the boundary between compile-time and runtime layers in computer systems, in addition to techniques that can be isolated to be part of either compile-time or runtime components. The methods combine architecture and compiler techniques into a compiler-enabled, tightly integrated, compiler-architecture based system design. The approach is called compiler-enabled if the execution of specific instructions is managed to some extent by static information.

This has the benefit of that in addition to dynamic techniques, static and static-dynamic energy reduction optimizations can be enabled. Additionally, the information exposed to runtime layers can be made available much earlier in the processor execution (pipeline), enabling energy reduction without negatively impacting execution latencies.

In general, there are two main ways the methods presented herein achieve energy reduction, without significantly affecting performance (for several applications studied performance has been improved): (1) redundancies in instruction executions are either eliminated or reduced, and (2) execution paths are simplified based on modified and/or new micro-architectural components. In both (1) and (2) the methods are leveraging various type of static information and/or dynamic information about resources used and/or resources (likely) needed, and/or information that can be used to estimate the resources likely to be used.

The methods leverage static program information in smart ways, and expose static resource utilization information for a particular application, to runtime layers. The apparatus extracts and leverages this information in a speculative manner, in both compiler and architecture components, i.e., in the new methods a superset of the predictable program information can be used.

The methods implement compiler analysis and micro-architectural techniques that enable the extraction and utilization of speculative static information without affecting correctness of execution. The methods also enable various degrees of static speculation (i.e., the extent to which information extracted is expected to be true during execution), to control the accuracy of static speculation.

Static speculation can be controlled on an application specific/adaptive basis and managed with compile-time flags. This provides unique post-fabrication (compile-time) customization of design objectives, as the type of information extracted and leveraged can be used to control tradeoffs between various design objectives such as power, performance, and predictability, without requiring changes in the architecture.

Additionally, the static speculation based approach is or can be combined with dynamic techniques, in a solution that leverages both statically predictable, statically speculative, and dynamic information.

Rather than extracting only predictable information, that would require a conservative compilation approach, the new methods extract speculative static information. Such information, that is likely to be true for the typical execution instance, provides a larger scope for optimizations. The information is leveraged speculatively and supported with micro-architectural techniques to provide correctness of execution.

In addition to enabling extraction of more program information, the methods also increase the flow of information between compile-time and runtime layers/optimizations, by exposing the speculative static information to runtime layers.

The methods encode statically extracted information about predicted resource utilization into the Instruction Set Architecture (ISA), so that this information can be leveraged at runtime. This approach enables a more energy-efficient execution if used together with micro-architectural components.

The methods can be used to reduce power and energy consumption in both embedded and general-purpose systems. Furthermore, the methods are applicable to a wide-range of computer systems, both state-of-the-art and emerging, which build on ISA interfaces between hardware and compilation layers. The methods are independent from device level technology, and can be used to reduce energy consumption in both silicon based (e.g., CMOS) and emerging nano electronics based (e.g., carbon nano tubes, nano wires, quantum dots) systems.

Memory Systems

The presented embodiment relates to the cache and memory system mechanisms. Nevertheless, other embodiments, on the same principles of statically speculative execution and compilation, can be constructed.

Background on Memory Systems

The cache is a fast memory hierarchy layer, typically smaller in size than the physical address space. It is one of the cornerstones of computer systems, used to hide the latency of main memory accessing. This is especially important, due to the increasing gap between execution speeds and memory latency. While execution speeds are known to double every 18 months (Moore's law), memory latencies are improving at a much lower rate. With the increasing cache sizes, necessary to hide memory latencies, the energy impact of cache accesses becomes even more significant in future generation designs.

Every instruction is fetched from the memory hierarchy. Approximately 20-25% of the program instructions are data memory accesses that are fetched from a layer in the (data) memory hierarchy. Hence, memory accessing (instructions and data related) accounts for a large fraction of the total processor energy.

As caches are typically smaller in size than the main physical memory, not all memory accesses may be cached (i.e., found in the cache) at a given time. Fast lookup and detection, of whether a memory access is cached or not, in caches, is provided through associative search mechanisms and matching of tag information associated with data blocks.

Conventional caches consist of a tag memory and a data-array. The data array is where the actual information is stored. The tag memory is storing additional information related to blocks of data (also called cache blocks or cache lines) in the data-array. The tag information can be imagined as a label that identifies a block of data in the cache. Every memory access has this kind of label associated, as part of its address. The tag extracted from the address is compared with labels in the tag-memory, during a memory access, to identify and validate the location of a data block in the data-array.

If there is a tag that matches the current memory tag, then the access results in a cache-hit and can be satisfied from the cache data-array. If there is no tag in the tag-memory that matches the current tag then the access is a cache-miss (at this level at least) and the memory access needs to be resolved from the next layer in the memory hierarchy.

In associative caches multiple ways (i.e., alternative locations) are looked up in both tag memory and data-array.

Different systems have different organizations for memory hierarchies. Some systems have only one layer of cache before the main memory system, others have multiple layers, each increasingly larger (and slower typically) but still much faster than the main memory. Additionally, a memory system can have additional roles as described next.

The broader memory system may include additional mechanisms such as address translation, Translation Lookahead Buffer (TLB), virtualization, protection, and various layers and organizations of memory. Address translation is the mechanism of mapping logical addresses into physical addresses. Logical addresses are typically the addresses that appear on the address pins of the processor, while the physical addresses are those that are used on the actual memory chips.

Virtualization is the mechanism that enables a program compiled to run on machines with different memory system organizations. Protection is a mechanism that guarantees that memory accesses are protected against writing into unauthorized memory areas.

Approach in Memory Systems

The main components in the methods to reduce energy consumption in the memory system are: (1) compiler techniques to extract/leverage static information about memory accessing and data-flow, (2) tag-less and way-predictive compiler-enabled cache architecture based on speculative memory accessing, (3) methodology to interface and integrate the new methods into conventional memory hierarchies and combine static and dynamic optimizations, and (4) ISA extensions to expose memory accessing information.

The remaining structure of this description is as follows. Next, two embodiments are introduced. First, the architecture of the Tag-less compiler-enabled cache and related compiler technology are presented. Then, a memory system that combines statically managed memory accessing with conventional memory accessing, a tagged statically speculative cache, the ISA extension, and an embodiment of the compiler technology are described.

EMBODIMENTS

Two implementation examples are presented, for the purpose of illustrating possible applications of the statically speculative execution and compilation methods in memory systems.

The first embodiment is a Tag-loss cache that can be integrated with other performance and energy reduction mechanisms. This scheme is especially attractive in embedded processors due to its low-cost, high-performance, low-power consumption as well as adaptivity to different application domains.

The second implementation is an embodiment in multi-level memory hierarchies. It shows how the method of statically speculative execution and compilation can be integrated in multi-level memory hierarchies. It provides the necessary compilation and architecture techniques for such integration. The methods are applicable, but not restricted to, both embedded and general-purpose domains.

1$^{st}$ Embodiment

Tag-Less Cache Architecture

This section describes an energy-efficient compiler-managed caching architecture, that has no tag memory and utilizes speculative static information. The architecture is shown in FIG. 1.

Its main components are: Hotlines Register File 3, Cache TLB (Translation Lookahead Buffer) 6, Hotlines Check 5, SRAM Memory 18, Scratchpad Memory 19, and Software (SW) Handler 15. The arrows represent signals or flow in execution that are required for explanation: Virtual Line 1, Hotline Index 2, Result of Cache TLB lookup 10, Cache TLB Miss signal 12, Hotline Register Hit/Miss result 5, Hotline Miss 7, Hotline Hit 8, Address from cache TLB 9, Cache TLB Hit 11, Software Handler Cache Hit 13, Address 16, Enable to Scratchpad 17, Software Handler Detected Cache Miss 14, Data output from SRAM 20, and Data output from scratchpad 21.

In this following explanation a design example where scalar accesses are mapped to the scratchpad 17 and the non-scalars to memory 18 is assumed. This however is not necessary; another application of this architecture is to map all the memory accesses to either the hotlines or the conventional paths. Other memory accessing techniques could also be combined with the ones described here.

The scratchpad access mechanism consumes very low power due to its small size (a 1 Kbytes memory is used, but this can be a banked memory where the actual use is application specific controlled by the compiler). All accesses directed to the scratchpad 17 are then output on 15, being enabled by signal 12 decoded from the memory instruction.

The memory instructions that are using the hotline path carry a hotline index 2 that has been determined at compile time. This identifies the hotline register from register file 3, predicted by the compiler to contain the address translation for the current memory access. Using this index 2, the corresponding hotline register is read from the hotline register file 3. A hotline register file is similar to a general purpose register file, but contains register promoted cache pointers instead of operands. In addition to the statically indexed mode, an associative lookup can also be implemented to speed up access during replacement.

The hotline register contains the virtual cache line address to SRAM line address 16 mapping. If the memory reference has the same virtual line address as that contained in the hotline register during the Hotlines Check 5 (i.e., correctly predicted speculative static information), there is a Hotline hit 8. Upon a correct static prediction, the SRAM can be accessed through the SRAM address 16; this address is from the hotline register that is combined with the offset part of the actual address, and the memory access is satisfied. The offset is the part of the address used to identify the word within a cache line. If there is a static misprediction (i.e., the memory access has been encoded at compile-time with an index that points at runtime to a hotline register that does not contain the right translation information) that causes a Hotline Miss 4, the cache TLB 6 is checked for the translation information.

If the cache TLB 6 hits or signal 11 is set, the hotline register file 3 is updated with the new translation, and the memory access is satisfied from the SRAM memory 18. Data is output on 20. A Cache TLB miss 12 invokes a compiler generated software handler 15 to perform the address translation. This handler checks the tag-directory (which itself can be stored in a non-mapped portion of the memory) to check if it is a cache miss 14.

On a miss 14, a line is selected for replacement and the required line is brought into its place—pretty much what happens in a hardware cache, but handled by software here. The cache TLB 6 and the hotline register 3 are updated with the new translation, and the memory access is satisfied by accessing the SRAM memory 18 and outputting the data on 20.

Because the software handler 15 is accessed so seldom, its overhead has minimal effect on the overall performance. This cache can, in fact, even surpass a regular hardware cache in terms of performance. For one, the interference between memory accesses mapped to different paths has been eliminated resulting in better hit-rate, and better cache utilization.

Secondly, a high associativity is basically emulated, without the disadvantage of the added access latency in regular associative caches, where higher associativity increases cache access times. Since the SRAM access mechanism is much less complicated than a regular tagged hardware cache, there is a possibility of reduction in cycle time.

Additionally, both the hotline path (i.e., 2, 3, 5, 7) and the scratchpad path (i.e., 17, 19, 21) will have a smaller hit latency than in a conventional cache. This latency (in conventional caches) would be even larger if runtime information is used to predict way accesses. Furthermore, an optimal line size can be chosen on a per application basis, as the line here is not fixed but it is based on a compiler determined (logical) mapping.

Access Mechanisms

This cache architecture combines four cache control techniques: (1) fully static through 19, (2) statically speculative through 2, 3, (3) hardware supported dynamic 6, and (4) software supported dynamic through the software handler 15. FIG. 1 shows this partitioning with the dotted line. To the left the architectural mechanisms implement dynamic control, to the right, static control.

The fully static cache management is based on disambiguation between accesses with small memory footprints such as the scalars and other memory accesses. Furthermore, frequently accessed memory references that have a small footprint can be mapped into the scratchpad area. This architecture can also be used without the scratchpad memory, by having all memory accesses mapped either through the statically speculative techniques or some other path.

The second technique in this architecture is based on a compile time speculative approach to eliminate tag-lookup and multiple cache way access. In addition, some of the cache logic found in associative caches can also be eliminated. The idea is that if a large percentage of cache accesses can be predicted statically, it is possible to eliminate the tag-array and the cache logic found in associative caches, and thus reduce power consumption.

The accesses that are directly mapped to the scratchpad memory require no additional runtime overhead. The statically speculative accesses however, if managed explicitly in the compiler, use virtual to SRAM address mappings or translations at runtime. This mapping is basically a translation of virtual cache line block addresses into SRAM cache lines, based on the line sizes assumed in the compiler.

Note that the partitioning of the SRAM into lines is only logical, the SRAM is mainly accessed at the word level, except for during fills associated with cache misses. Inserting a sequence of compiler-generated instructions, at the expense of added software overhead, can do this translation. For many applications there is a lot of reuse of these address mappings. The compiler can speculatively register-promote the most recent translations into a small new register area—the hotline register file. With special memory instructions, or other type of encoding of this information, the runtime overhead of speculation checking can be completely eliminated. Nevertheless, in simple designs a software based check that can be implemented in four regular instructions is also possible.

To avoid paying the penalty during a statically miss-predicted access, a small fully associative Cache TLB 6 is used to cache address mappings for memory accesses that are miss-predicted. A 16-entry Cache TLB 6 is enough to catch most of the address translations that are not predicted correctly statically. Different application domains may work fine with a smaller or require a slightly larger size for optimum energy savings.

The fourth technique used in this architecture, is basically a fully reconfigurable software cache 15. This technique is a backup solution, and it can implement a highly associative mapping. This implementation is for example based on a four-way associative cache. The mapping table between virtual cache lines 1 and physical SRAM lines 16 can be implemented similar to an inverted page table or other schemes. Experimental results show that the combined static and cache TLB techniques often capture/predict correctly more than 99% of the memory accesses.

From a power perspective, this cache has substantial gains compared to a conventional hardware cache for two reasons. First, there are no tag-lookups on scalar accesses and correctly predicted non-scalar accesses. Second, the SRAM is used as a simple addressable memory—the complicated access mechanisms of a regular cache consume more power and increase the memory access latency (e.g., the hit-latency).

$2^{nd}$ Embodiment

Statically Speculative Memory Accessing in Conventional Memory Systems

In general there are two main steps involved in a memory access: (1) converting the program address to a cache address, and (2) accessing the data from this address, if present in cache (accessing the slower memory such as DRAM if not present). Depending on the implementation, there can be considerable power/performance redundancy associated with both of these steps. This redundancy problem is described in the next subsection, following with implementation embodiments to tackle this problem. The invention is not limited to these embodiments.

Figure 3:
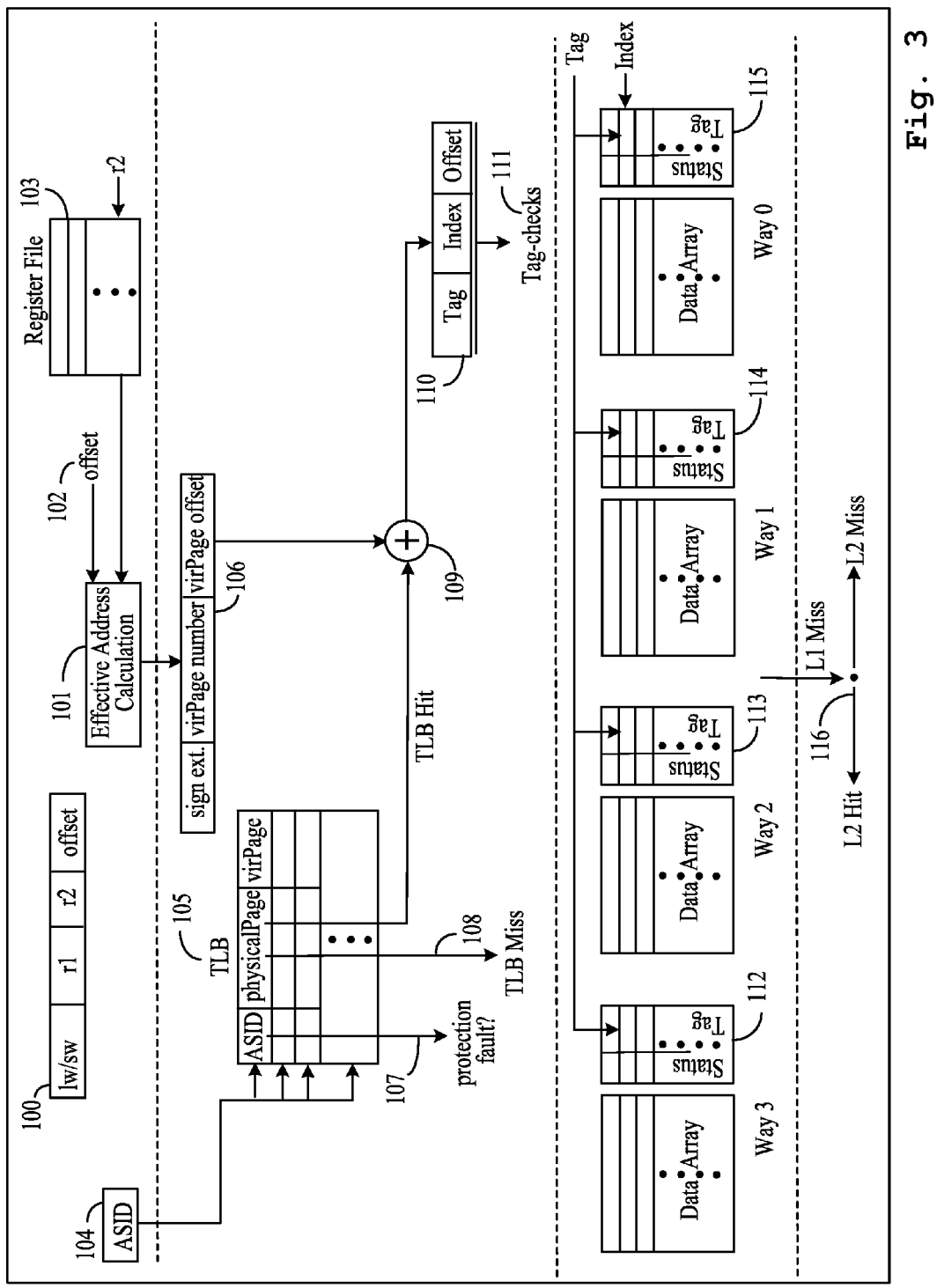
FIG. 3 is a block diagram of a baseline memory system, where all accesses require address translation, multi-way cache access, and tag-checks.

FIG. 3 shows the memory access process. The translation function translates the larger program address 100 into a cache block address shown as part of 110 (the lower order block offset bits in 100 do not undergo any translation).

Depending on the caching scheme, this translation can be very expensive, both energy-wise (for example, on a virtual memory system with a 4-way cache, the virtual address 100 will be converted to physical address by the TLB 105, and all the 4 tag and data arrays 112,113,114,115 would be looked up in parallel), and performance-wise (if the cache is software managed, doing the translation in software will consume valuable CPU cycles). The translation information 109 in case of a TLB hit 108 is added with the offset to form address 110 that is used to access the cache.

Where is the redundancy? Looking at a cache block level, two program addresses with the same virtual block address map to the same cache block. Therefore, the second translation is redundant. In general, if there is a group of memory accesses mapping to the same cache block, repeating the translation process on each access can be wasteful. Additionally, if the cache way for the access is known, looking up all the four ways (e.g., way 3 112, way 2 113, way 1 114) is not necessary. Furthermore, the tag lookup 111 is wasteful if the tag has been checked for an earlier access in the same cache block.

The usual implementation maps all the accesses to the same cache. This scheme may also be extravagant: many applications often exhibit the behavior where a small set of references are accessed very often—these can be accommodated in a small partition of the cache which consumes much less power. Therefore, partitioning the cache and devising a wiser translation function, which maps different accesses to different cache partitions depending on their access pattern, can amount to sizable energy savings.

The aforementioned redundancies are tackled using a cooperative compiler-architecture approach. Specifically, compiler analysis techniques that identify accesses likely to map to the same cache line are developed. These accesses can avoid repeated translation to save energy. The compiler in the proposed method speculatively register promotes the translations for such groups of accesses.

These registers that contain address translation information are provided as a form of architectural support. At runtime, the architecture is responsible for verifying static speculations: if correctly predicted by the compiler, the expensive translation is eliminated. On mispredictions, the architecture can update the registers with new information. Further, the level of speculation in the compiler can be varied to better match application behavior. Henceforth, the solution proposed is referred to as the microarchitecture in $2^{nd}$ embodiment.

Conventional general-purpose microprocessors use a one-size-fits-all access mechanism for all accesses. The subject architecture in the $2^{nd}$ embodiment derives its energy savings by providing different energy-efficient access paths that are compiler-matched to different types of accesses. Next an overview of the subject architecture in the $2^{nd}$ embodiment is presented and followed with detailed discussions on the features of this architecture.

Two different organizations of the architecture in the $2^{nd}$ embodiment are shown. In both organizations a virtually-indexed and virtually-tagged first level cache is used and address translation is moved to lower levels in the memory hierarchy. Other type of cache organizations are also possible. As second level or L2 cache, both a physically-indexed and a virtually-indexed cache are shown. Some of the design challenges in virtual-virtual organizations (e.g., the synonym problem, integration in bus based multiprocessor systems, and context-switching with large virtual L2 caches) could be handled easier in virtual-physical designs. In both organizations, translation buffers are added. A translation buffer is a cache for page level address translations and is used to avoid the more expensive page table lookup in virtual memory systems.

In the virtual-virtual (v-v) organization, a translation buffer (MTLB) is added after the L2 cache and is accessed for every L2 cache miss. This serves better the energy optimization objectives than a TLB-less design, where address translation is implemented in software. Nevertheless, if increased flexibility is desired, in the way paging is implemented in the operating system, the TLB-less design is a reasonable option (experimental results prove this point). In the virtual-physical organization (v-r), a translation buffer (STLB) is added after the L1 cache and is accessed for every L1 cache miss or every L2 cache access.

Figure 2:
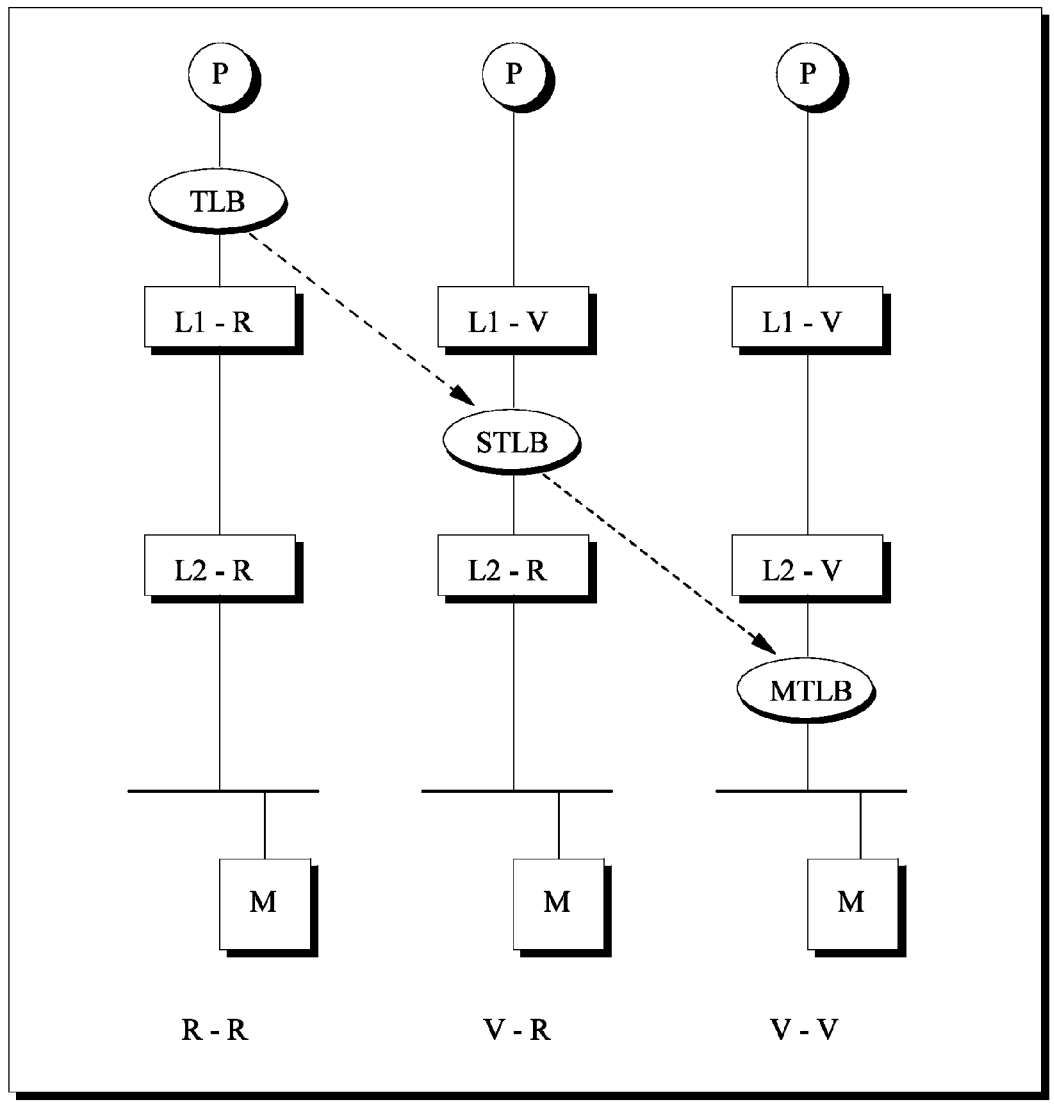
FIG. 2 is a block diagram of cache organizations with address translation moved towards lower levels in the memory hierarchy, STLB is the translation buffer between L1 and L2 caches, and MTLB is the translation buffer added between L2 cache and main memory.

An overview of the different cache organizations with address translation moved towards lower levels in the cache hierarchy is shown in FIG. 2. As address translation consumes a significant fraction of the energy consumed in the memory system, both the v-v and v-r designs will save energy compared to a physical-physical (r-r) cache hierarchy, where virtual-to-physical address translation is done for every memory access.

A context-switch between threads belonging to different tasks may require change in virtual address mappings. To avoid flushing the TLBs address-space identifiers to TLB entries are added. Note that not having the address-space identifiers not only would require flushing all the TLB entries, but would also imply that the newly scheduled thread, once it starts executing, will experience a number of TLB misses until its working set is mapped.

Figure 4:
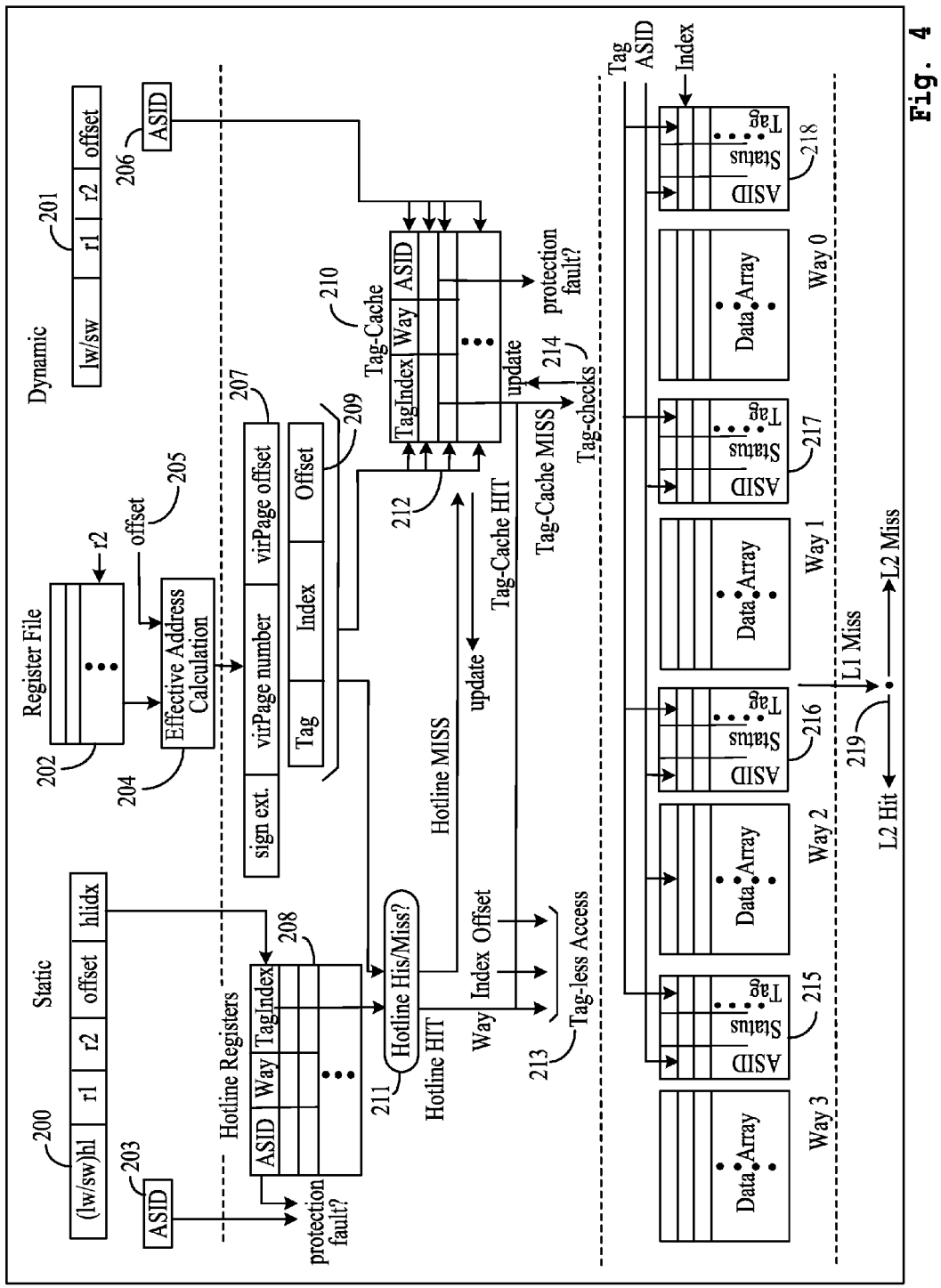
FIG. 4 is a block diagram showing an example of implementation of the microarchitecture in the $2^{nd}$ embodiment.

FIG. 4 presents an overview of the subject architecture in the $2^{nd}$ embodiment memory system, with integrated static 200 and dynamic 201 access paths. The subject architecture in the 2nd embodiment extends associative cache lookup mechanism 215, 216, 217, 218, with simpler, direct addressing modes 213, in a virtually tagged and indexed cache organization. This direct addressing mechanism 213 eliminates the associative tag-checks (i.e., no tag-lookup as shown in 215,216, 217, 218 is required) and data-array accesses (i.e., only one of the data-arrays from 215, 216, 217, 218 is accessed). The compiler-managed speculative direct addressing mechanism uses the hotline registers 208. Static mispredictions are directed to the CAM based Tag-Cache 210, a structure storing cache line addresses for the most recently accessed cache lines. Tag-Cache hits also directly address the cache, and the conventional associative lookup mechanism is used only on Tag-Cache misses. Integration of protection-checks along all cache access paths (208, 210 and conventional) enables moving address translation to lower levels in the memory hierarchy, as described earlier, or TLB-less operation. In case of TLB-less designs, an L2 cache miss requires virtual-to-physical address translation for accessing the main memory; a software virtual memory exception handler can do the needful.

Support for Moving the TLB to Lower Levels in the Memory Hierarchy or TLB-Less Operation The subject architecture in the 2nd embodiment employs virtually addressed caches, and integrates support for protection checks, otherwise performed by the TLB, along all access mechanisms. That is, the subject architecture in the 2nd embodiment has embedded protection checks in the Hotline registers 208, the Tag-Cache 210, and cache tags (shown as part of 215, 216, 217, 218). The subject architecture in the 2nd embodiment therefore could completely dispense with the TLB.

L2 cache misses in the v-v organization require address translation for the main memory access. The subject architecture in the 2nd embodiment uses translation buffer to speed up this address translation, but a software VM exception handler for doing the translation on L2 cache misses and fetching the data from the main memory can also be used.

The statically speculative, compiler managed memory accessing can also be integrated in other type of memory hierarchies.

Hotline Registers

The conventional associative lookup approach 4 parallel tag-checks and data-array accesses (in a 4-way cache). Depending on the matching tag, one of the 4 cache lines is selected and the rest discarded. Now for sequences of accesses mapping to the same cache line, the conventional mechanism is highly redundant: the same cache line and tag match on each access. The subject architecture in the 2nd embodiment reduces this redundancy by identifying at compile-time, accesses likely to lie in the same cache line, and mapping them speculatively through one of the hotline registers 208.

The condition that the hotline path evaluates can be done very efficiently without carry propagation. The hotline cache access can also be started in parallel with the check, with the consequence that in case of incorrect prediction some additional power is consumed in the data-array decoder. As a result, the primary source of latency for hotline based accesses, is due to the data array access and the delay through the sense amps. Note that conventional associative cache designs use an additional multiplexer stage to select between ways in a multi-way access (i.e., the correct block from the ways 215, 216, 217, 218). Furthermore, as shown in previous cache designs, the critical path is typically the tag-path; the tag latency can be as much as 30% larger than the latency of the data-array path in the conventional design.

Reduced feature sizes in next generation architectures will further accentuate the latency increase of the tag path. Because of this, in conventional cache designs, the way-selection logic is moved towards the tag to rebalance the delay differences between the tag and data-array paths. In the subject architecture in the 2nd embodiment the latency of the data-array could be the main target for optimizations, as the tag path is not on the critical path for most of the memory accesses, by adequate bitline and wordline partitioning. Additionally, as physical cache designs would require the TLB access completed to perform the tag comparison (the tag access could be however done in parallel), this may also add to the tag path latency. As such, the subject architecture in the 2nd embodiment based microprocessor could either have a faster clock or at least a faster cache access for statically predicted cache accesses.

The different hotline compiler techniques are described in the next section. A simple run-time comparison 211 reveals if the static prediction is correct. The cache is directly accessed on correct predictions 213, and the hotline register 208 updated with the new information on mispredictions. A fully associative lookup on the hotline registers to support invalidations is included.

Figure 6:
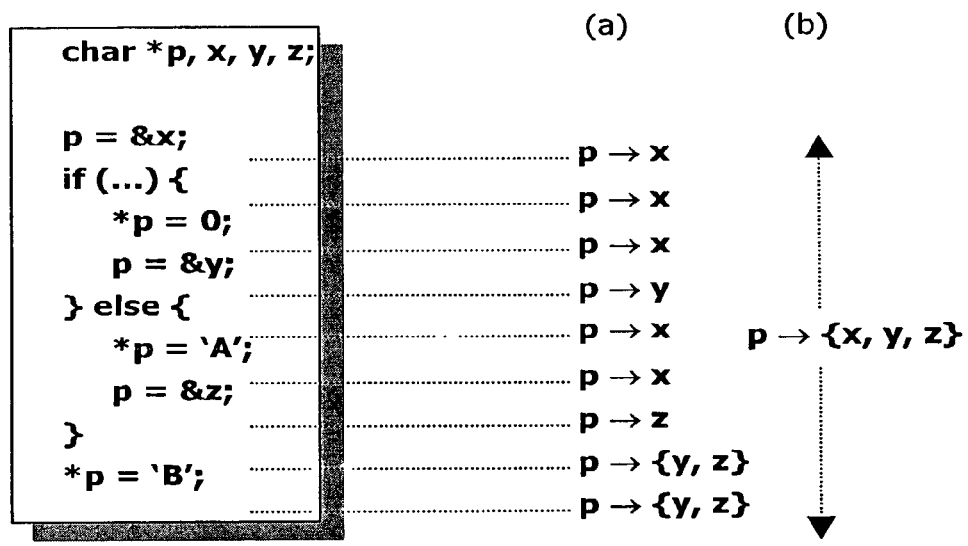
FIG. 6 is a diagram for alternative pointer representations: (a) program-point representation, (b) through global information.

As shown in FIG. 6, a hotline register 208 has 3 components: (1) protection bits (ASID), which are used to enforce address space protection, (2) TagIndex—two accesses are to the same cache line if their Tag and Index components are the same. The TagIndex component is compared with Tag and Index of the actual access to check if the hotline register can indeed be used to directly address the cache, (3) cache-way information—this information enables direct access to one of the ways in the set-associative cache.

Tag-Cache

Another energy-efficient cache access path in the subject architecture in the 2nd embodiment is the Tag-Cache 210. It is used both for static mispredictions (hotline misses 212) and accesses not mapped through the hotline registers, i.e., dynamic accesses 201. Hence it serves the dual-role of complementing the compiler-mapped static accesses by storing cache-line addresses recently replaced from the hotline registers, and also saving cache energy for dynamic accesses; the cache is directly accessed on Tag-Cache hits 211, 213.

A miss in the Tag-Cache 210 implies that associative lookup mechanism is used with an additional cycle performance overhead. The Tag-Cache is also updated with the new information on misses, in for example LRU fashion. As seen in FIG. 4, each Tag-Cache 210 entry is exactly the same as a hotline register 208, and performs the same functions, but dynamically.

Associative Lookup

The subject architecture in the 2nd embodiment uses an associative cache lookup that is different from the conventional lookup in that the protection information (ASID) is also tagged to each cache line. Even the virtually addressed L2 cache is tagged with protection information in the v-v design to enable TLB-less L2 access. This increases the area occupied by the tag-arrays, and also its power consumption. Compared to the overall cache area and energy consumption, this increase is however negligible.

Instruction Set Architecture (ISA) Support

To access the memory through the hotline registers, memory operations 200 that encode the hotline register index should be provided. This index is filled in during compile Lime based on the techniques described in the compiler section. The implementation should perform a simple check 211 between the content of the hotline register identified and the actual virtual block address, as shown in FIG. 4. Special instructions, rather than modifications to existing can also be provided for example. Alternatively, techniques requiring no ISA modifications could also be used, as shown in the section. The invention is not limited to type of encodings described herein.

Approach Not Requiring ISA Support

Static information about the hotline registers 208 accessed could be provided by generating code that writes this into predetermined memory locations, e.g., into a stream-buffer. This buffer can be used to add the index at runtime to memory accesses in the critical path. For example, memory accesses that are identified in critical loops could use the index information from this buffer during the Instruction Decode stage to access the hotline registers. The invention is not limited to type of encodings described herein.

An Embodiment of the Compilation Process

Figure 5:
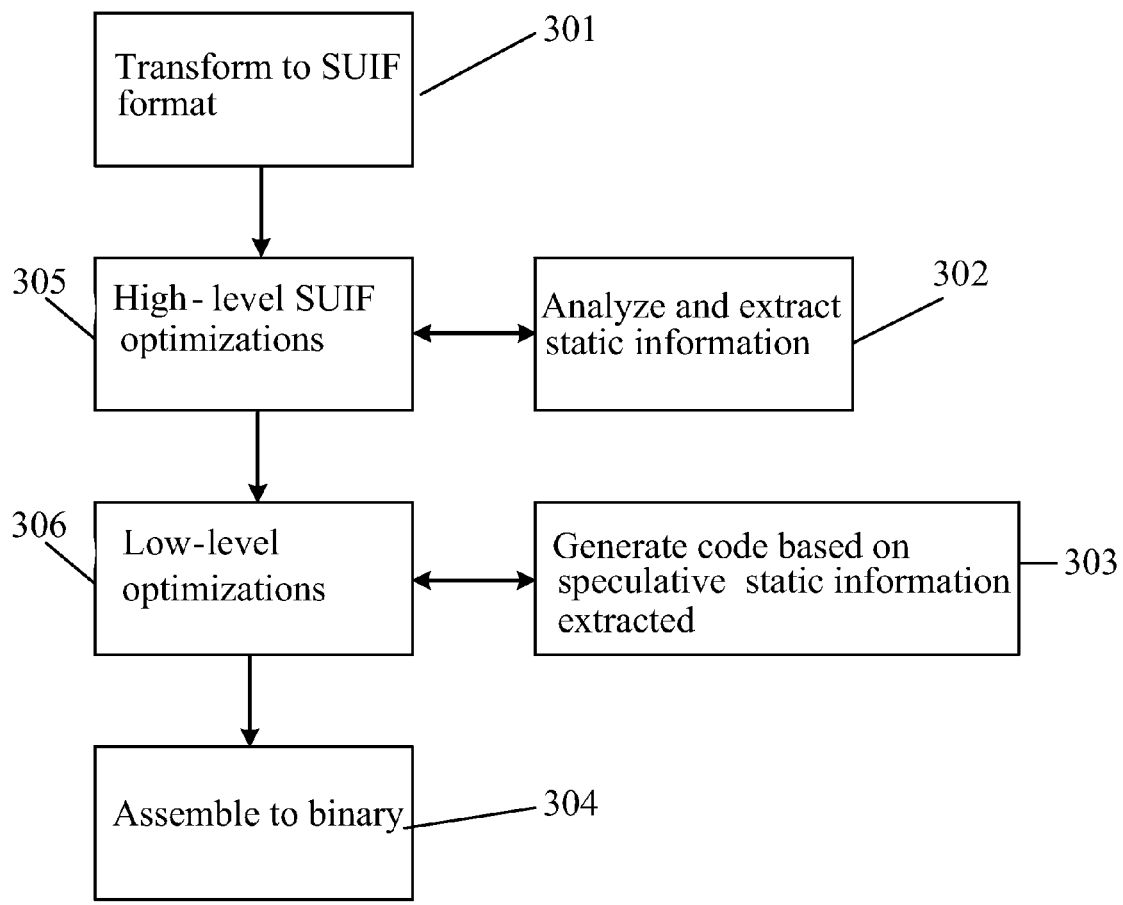
FIG. 5 is a flow diagram of an embodiment of the compilation process.

FIG. 5 shows a high-level picture of the stages involved in an embodiment for compilation. The implementation is using the SUIF format. The invention is not limited to this format or to the compilation embodiment presented.

The program sources are first converted to the intermediate format 301 and high-level optimizations are performed 306. Following that is the Alias Analysis stage, or equivalent, and the Hotlines passes 302. Alias information enables the Hotline Analysis to more economically assign hotlines to references (i.e., map cache pointers to registers). Without alias analysis, the compiler would liberally assign each memory reference a new hotline number. This will have a downgrading effect only if the number of references within inner loop bodies is more than the number of hotlines, resulting in the same hotlines being assigned to possibly spatially far apart references. This would cause interference and result in lower prediction rates. For many applications, the media benchmarks tested in particular though, this is not so and the alias analysis stage could be omitted with minimal effect on the prediction rates. Code is generated based on the information extracted in 303. Optimizations are performed on the high-level representation 305 (e.g., based on expression trees) and low-level representation 306 (e.g., flat instruction sequences). Finally the generated code is run through an assembler 304 and results in a binary.

The Section "Hotlines With Speculative Alias analysis shows a speculative data-flow analysis technique that further improves on the precision the range of location sets is determined and extends its scope to large and complex applications. Additional passes include code generation 303 that takes into consideration the results of the analysis above, and then assembling the code 305 into a binary format.

Caches represent a large fraction of processor power consumption. Given accesses, a speculative analysis to predict which cache line is being accessed is used. Although it is impossible do this with perfect accuracy, the methods described herein provide an approach with good overall accuracy. Moreover, as pointed out above, it is not necessary for predictions to be perfect, rather, they should be right sufficiently often that one can make beneficial use of them.

Almost all programs exhibit the behavior where certain cache lines are "hot", i.e., they are being used much more frequently than others. If the compiler can register promote the cache pointers for these hot cache lines, the lookup for the many accesses mapping to these cache lines can be avoided, i.e., the compiler can identify at cache lines that are heavily used, and for all accesses going to these, map them through an energy-efficient memory access mechanism.

Basic Hotlines Analysis

This process assigns each variable name a different hotline register starting with the first register. When all the registers have been used up, it wraps around back to the first register. The following example illustrates this process:

```
for(i = 0; i < 100; i++) {
    a[i]{1} = a[i+1]{1};   // numbers in curly braces
    b[i]{2} = 0;           // are the hotline registers
    *(p++){3} = 1;         // assigned by the process
}
```

The variables have been assigned three hotline registers. For example, the hotlines process predicts that all the a[ ] accesses for example, will map to the same cache line and register promotes the cache pointer in register 1.

In particular, it the a[ ] is a word-sized array and the cache line is 8 words wide, a[0] and a[7] could map to one cache line, a[8] through a[15] to another, and so on.

Therefore, for this case, the process has seven correct predictions for every misprediction.

In general, this simple process works well with programs with high spatial locality, like multimedia programs. Below, enhancements to the basic approach are described.

Hotlines Combined with Alias Analysis

An accurate flow and context sensitive alias analysis can reveal the location set that any pointer can be pointing to at any given context in the program. Consider the following example:

```
int a[100], b[100];
..
..
if (....) p = a; else p = b;
for(i = 0; i < 100; i++) {
    a[i] = 0;
        *(p++) = 1; // location_set(p) = {a, b}
}
```

The if-statement assigns either the array a or b to the pointer p. This means that inside the loop, p could be accessing either array a or b.

A context- and flow-sensitive compiler would extract this information: the location sets of pointers at various points in the program. As mentioned earlier, this can help in a more efficient hotline process: perform alias analysis and then during the hotlines phase, utilize alias information to better handle pointer-based accesses.

Perfect alias analysis is not typically possible for large and complex applications, especially those using precompiled libraries. Instead, a speculative alias analysis is developed as part of the solution proposed. This is described in Section "Hotlines with Speculative Alias Analysis".

Enhancement with Type, Distance and Dependence Analysis

This process hotlines all accesses like the basic hotline process, but is more refined. If an array a[ ] has been mapped through register r1, it won't necessarily be mapped through register 1 again. Instead the process will try to calculate the spatial distance of this access to the previous one. Only if they are sufficiently close will they be mapped through the same register.

The following example illustrates how the process works:

```
for (i = 0; i <100; i++) {
    a[i]{1} = a[i+1]{1} + a[i+100]{2} + a[i+103]{2};
    b[i]{3} = 0;             // number in curly braces is the hotline
    p{4} = p->next{4}        // register assigned by the process
}
```

Suppose the array element-size is 4 bytes, the cache line is 64 bytes, and that two accesses are mapped to the same register if they are within 32 bytes from each other.

The hotlines process first assigns a[i] hotline register r1. When it comes to a[i+1], it checks the distance from currently mapped accesses, and finds the closest one to be a[i] which is 4 bytes apart. Since this is within the threshold, a[i+1] is also mapped through r1. For a[i+100], the closest access a[i+1] is 396 bytes apart, and hence a[i+100] is mapped through a different hotline. The array accesses b[ ] is assigned register r3 and so on.

In evaluating the distance between two accesses, the hotlines process uses control-flow, loop structure, dependence and type information: field offsets in structures, array element sizes, etc.

Support for Various Levels of Static Speculation

This process can be made to vary in its level of aggressiveness. A very aggressive version would carry out actions based on predictions which do not necessarily have a high degree of confidence. A conservative version may not do so, for instance, it would not hotline non-affine array accesses of the form a[b[i]] which are generally hard to predict. Different versions of this process with different levels of aggressiveness can be constructed. The invention is not limited to one particular implementation.

Hotlines with Speculative Alias Analysis

This analysis is part of the embodiment presented for the compilation process. The objective of this analysis is to extract precise information about memory access patterns in pointer based accesses. The proposed technique is speculative in the sense that the possible values for each pointer access are determined and included based on their likelihood of occurrence at runtime. Unlikely values are ignored and highly likely values are added, even when the full proof cannot be derived at compile-time.

One of the primary motivations for developing the speculative alias analysis (SAA) process is because the more precise implementations of non-speculative alias analysis have limitations when used for large programs or when special constructs such as pointer based calls, recursion, or library calls are found in the program. The less precise alias analysis techniques, that are typically used in optimizing compilers, have lower complexities but they are much less useful in the context of extracting precise information about memory access patterns. The experience with several state-of-the-art research alias analysis packages shows that they don't work well for these programs. For example, none of the SPEC2000 benchmarks could be analyzed with them. SAA based analysis can not only be applied without restrictions and has lower complexity, but also provides more precise information about memory accesses.

The information given by this analysis can be used in the hotlines processes, e.g., to determine which cache pointer (or hotline register) to assign to a given pointer based memory access. Additionally, the same information can be used in disambiguating pointer based loop-carried dependencies, to estimate loop level parallelism in addition to ILP.

There are two ways to give pointer information: (1) through program-point information, and (2) through global information. FIG. 6 shows a simple C program and illustrates the difference between these representations.

Program point information for example would show that at the end of the program segment in FIG. 6, pointer p points to {y,z}, a more precise information, compared with the global information case where p points to {x,y,z}. Although global information can be extracted with much more efficient analysis process, it gives less precise results.

In general, alias analysis is done at either the intra-procedural level or at the inter-procedural level. The latter considers analysis across call statements, attempts to handle recursive, and pointer-based calls.

For intra-procedural analysis, a variety of processes with different degrees of precision and efficiency have been developed. A more precise analysis results in narrower sets (i.e., fewer possible values for a pointer to take). Flow-sensitive analysis takes control flow into account usually giving program-point results. Flow-insensitive analysis views a program as a set of statements that can be executed in any order and gives per program or global results.

Flow-insensitive processes can be built on top of a type-based analysis or constrained-based analysis. Because of the higher precision of flow-sensitive approaches are of more interest in these techniques. Flow-sensitive approaches are typically based on traditional dataflow analysis, where pointer information is represented with points-to graphs (PTG). The speculative approach defined in the SAA process could be applied to any type of alias analysis.

Nodes in a PTG correspond to program variables and edges represent points-to relations. A points-to relation connects two variables and means that a pointer variable can take the value of another variable during execution. Intuitively, a smaller number of points-to relations means better precision.

Figure 7:
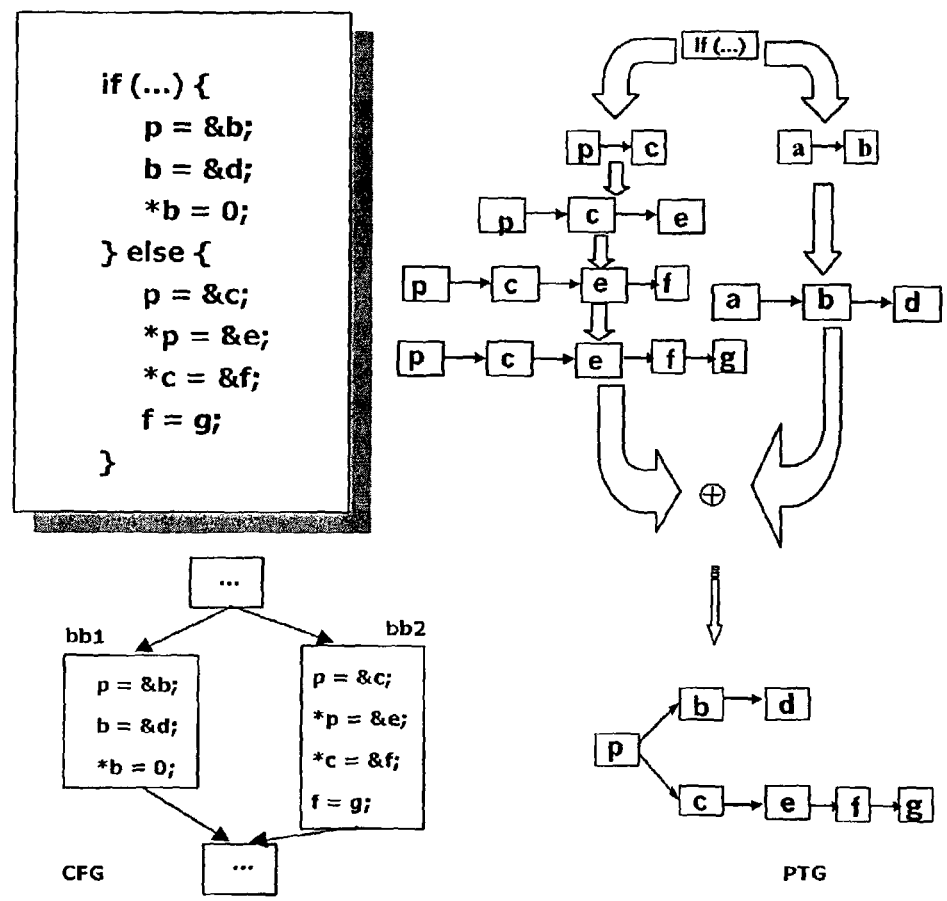
FIG. 7 is a diagram representing CFG and PTG graphs derived for a simple C program.

The main steps in a non-speculative flow-sensitive analysis process are as follows: (1) build a control-flow graph (CFG) of the computation, (2) analyze each basic block in the CFG gradually building a PTG, (3) at the beginning of each basic block merge information from previous basic blocks, (4) repeat steps 2-3 until the PTG graph does not change. See for example in FIG. 7, the CFG and the PTG for a simple C application.

This analysis builds a PTG for the program in a conservative way, i.e., it guarantees that for each variable all the possible points-to relations are captured. The SAA approach removes some of these points-to relations when it predicts them as seldom-occurring. A point-to relation is defined to be a weak points-to relation if the edge is less likely to be leveraged during execution compared to other points-to relations from the same pointer variable.

Figure 8:
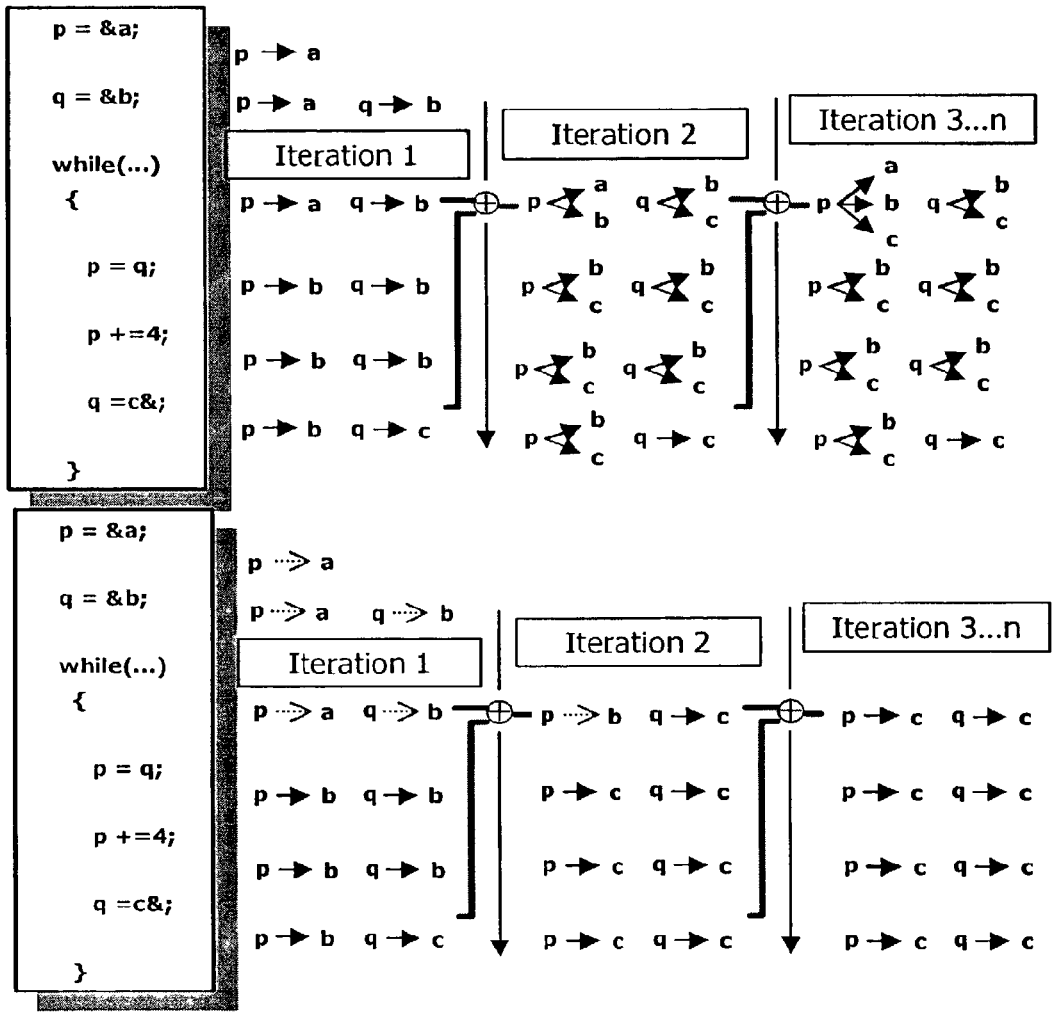
FIG. 8 is a diagram representing a simple loop-based example analyzed with traditional flow-sensitive AA (top) and the SAA method (bottom), that shows that SAA achieves higher precision by removing all weak point-to relations after each merging-step, where the weak point-to relations are shown with dotted arrows.

FIG. 8 exemplifies the flow-sensitive embodiment of the SAA process in loops, for the simple case when point-to relations are mapped to either weak or strong ones. One of the process's rules is that the incoming location sets are the weak point-to relations, and are removed if there is any strong point-to relation for the same access within the loop body. A generalization of this process, for nested loops, is to consider loop nests organized in pairs, with inner loop updates being strong and incoming edges weak, and so on.

FIG. 8 shows that a great deal of precision has been obtained by removing several edges in the PTG. For example, both pointer p and q has been determined to point to only variable c after only three iterations in the process.

The complexity of the SAA process is reduced compared to traditional alias analysis process. One possible implementation is by stopping the dataflow analysis after a certain number of iterations. Other implementations are also possible. The main complexity in non-speculative alias analysis is coming from dealing with loops, recursive calls, multi-threaded analysis, and library calls in an inter-procedural analysis. The analysis in the SAA process applies an approximate approach and stops the dataflow analysis before full convergence is reached in such cases. Library calls that may modify pointer values and for which source codes are not available can also be speculatively estimated or ignored.

An example of implementation of the SAA process is as follows: (1) build a control-flow graph (CFG) of the computation, (2) analyze each basic block in the CFG gradually building a points-to graph (PTG), (3) at the beginning of each basic block merge information from previous basic blocks, (4) annotate weak and strong point-to relations focusing on loops by looking at incoming point-to relations and point-to relations in loop bodies, (5) speculatively estimate recursive calls and library calls, (6) repeat steps 2-5 until the PTG graph does not change or until a predetermined number of steps in the analysis have been reached.

The methods described in this embodiment have been implemented and carefully evaluated.

Figure 9:
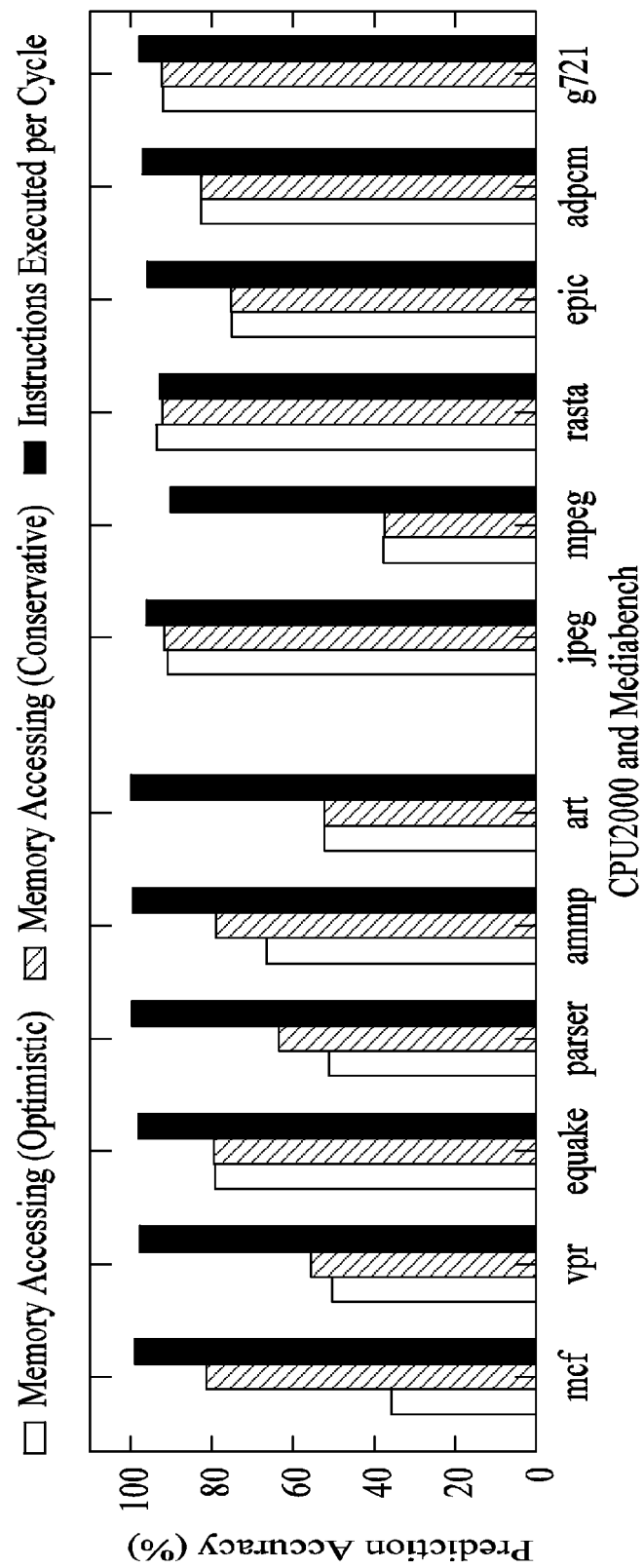
FIG. 9 is a diagram showing the accuracy of static speculation for one set of parameters suing the industry standard CPU2000 and Mediabench benchmarks.

A small sampling of data giving a preview of the accuracy of static speculation obtained with this implementation is presented in FIG. 9. As shown, both memory accessing and instructions executed per cycle could be predicted statically with good accuracy. Better prediction translates into the possibility of saving more energy.

Figure 10:
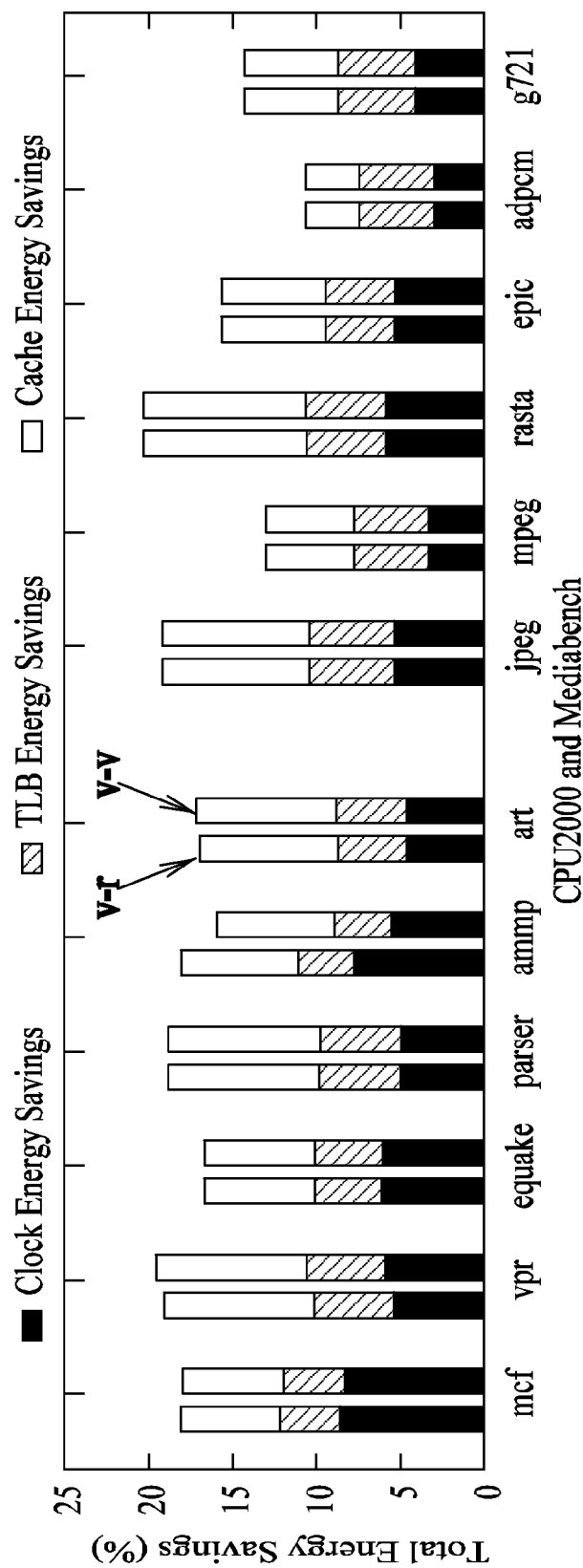
FIG. 10 is a diagram showing chip-wide energy reduction due to reduction in memory consumption obtained with the microarchitecture in the second embodiment as compared to an Alpha 21264 processor.

FIG. 10 shows the breakdown of processor-wide energy savings obtained due to significantly reduced energy consumed in the memory system. It shows that up to 75% of the energy consumed in memory accessing can be saved. This translates into up to 21% total energy reduction in an Alpha 21264 type of processor. A description of some the benchmarks evaluated, but not limited to, is presented in FIG. 11.

The invention is not limited to, but can also be used to improve performance in processors. Reduction of access latencies in caches, for example, in the embodiments shown, can improve memory accessing performance. Alternatively, it can enable faster clock rates that would reduce execution time, or would enable using larger caches that would improve memory performance. Other performance benefits can result from, but not limited to, more efficient execution.

Other embodiments not described herein are also within the scope of the following claims.

What is claimed is:

1. A method, for use with a compiler architecture framework, the method comprising:
    performing a statically speculative compilation process on a computer program to extract speculative static information; and
    encoding the speculative static information in an instruction set architecture of a processor in order to affect power consumption of a processor resource during use thereof, the speculatively static information identifying an access path of the processor resource, the identified path to be utilized at run time to reduce power consumption of an individual use of the processor resource.

2. The method of claim 1, further comprising controlling the processor resource using the speculative static information encoded in the instruction set architecture.

3. The method of claim 1, further comprising operating processor-related mechanisms using the speculative static information encoded in the instruction set architecture.

4. The method of claim 1, wherein the speculative static information comprises at least one of information about processor resource demands or information that contributes to determining processor resource demands.

5. The method of claim 1, wherein the instruction set architecture comprises modified or additional instructions configured to propagate information through code and to store information.

6. The method of claim 1, wherein the statically speculative compilation process exposes speculative static information to run time layers; and
wherein a microarchitecture to perform execution at run time provides a mechanism to recover from static misprediction.

7. The method of claim 1, wherein the speculative static information comprises a single command encoded in the instruction set architecture, the single command for implementing plural techniques to reduce processor power consumption.

8. The method of claim 7, wherein the statically speculative compilation process determines processor performance and energy tradeoffs during compile-time.

9. The method of claim 1, wherein the speculative static information comprises predictable static information and additional static information that is speculated based on the predictable static information.

10. The method of claim 1, wherein the statically speculative compilation process performs static speculation, the static speculation determining information about execution of the compiled computer program, the static speculation being controlled on application-specific and adaptive bases and being managed with compile-time flags.

11. The method of claim 1, wherein more information about processor resource usage is exposed with speculative static compilation than with predictable static information.

12. A method, comprising:
accessing speculative static information encoded in an instruction set architecture of a processor in order to affect power consumption of a processor resource during use thereof, the speculative static information generated prior to run time, the speculative static information identifying an access path of the processor resource; and
executing a compiled computer program in the processor using the speculative static information encoded in the instruction set architecture, wherein the executing comprises using the access path at run time to reduce resource power consumption for an individual use of the processor resource.

13. The method of claim 12, wherein the executing is performed by microarchitecture that contains an extension, the extension supporting correctness of execution for performing the statically speculative compilation process.

14. The method of claim 13, wherein the extension is comprised of at least one of hardware or software.

15. An apparatus, comprising:
a tagless cache system that is accessible at run time based on speculative static information about a computer program, the speculative static information extracted from the computer program prior to runtime; and
a microarchitecture to access the tagless cache system at run time, the microarchitecture configured to utilize the speculative static information to predict access paths for cache accesses at run time, wherein individual cache accesses predicted using the speculative static information contribute to reduction in cache power and processing device energy consumption.

16. The apparatus of claim 15, wherein the speculative static information is used to register promote cache pointer information to predict cache accesses.

17. The apparatus of claim 15, wherein the speculative static information is used to select cache pointers at run time to predict cache accesses.

18. The apparatus of claim 15, further comprising a scratchpad-memory based cache mechanism;
wherein frequently used data with a low memory footprint is mapped to the scratchpad-memory based cache mechanism.

19. The apparatus of claim 18, wherein associativity and block size in the tagless cache system are logical and programmable.

20. The apparatus of claim 18, further comprising a Cache TLB (Translation Look-ahead Buffer) for capturing statically mispredicted cache pointers and other types of cache pointers.

21. The apparatus of claim 15, wherein individual cache accesses predicted using the speculative static information contribute to reduction in cache power and processor energy consumption.

22. An apparatus, comprising:
means for recovering speculative static information encoded in an instruction set architecture of a processor in order to affect power consumption of a processor resource during use thereof, the speculative static information generated prior to run time, the speculative static information identifying an access path of the processor resource; and
means for utilizing the identified path at run time to reduce power consumption of an individual use of the processor resource at a time of execution of a compiled computer program corresponding to the speculative static information encoded in the instruction set architecture.

* * * * *